(12) United States Patent
Lee et al.

(10) Patent No.: US 11,448,820 B2
(45) Date of Patent: Sep. 20, 2022

(54) INTEGRATED OPTICAL FIBER AND EPSILON-NEAR-ZERO MATERIAL

(71) Applicant: Baylor University, Waco, TX (US)

(72) Inventors: Ho Wai Howard Lee, Waco, TX (US); Khant Minn, Waco, TX (US); Jingyi Yang, Waco, TX (US); Oleksiy Anopchenko, Waco, TX (US)

(73) Assignee: Baylor University, Waco, TX (US)

( * ) Notice: Subject to any disclaimer, the term of this patent is extended or adjusted under 35 U.S.C. 154(b) by 0 days.

(21) Appl. No.: 16/780,439

(22) Filed: Feb. 3, 2020

(65) Prior Publication Data

US 2020/0284975 A1    Sep. 10, 2020

Related U.S. Application Data

(60) Provisional application No. 62/800,806, filed on Feb. 4, 2019.

(51) Int. Cl.
*G02B 6/02* (2006.01)
*G02B 6/27* (2006.01)

(52) U.S. Cl.
CPC ....... *G02B 6/02028* (2013.01); *G02B 6/2746* (2013.01)

(58) Field of Classification Search
CPC .............. G02B 6/02028; G02B 6/2746
See application file for complete search history.

(56) References Cited

U.S. PATENT DOCUMENTS 8,848,273 B2   9/2014   Yu et al.
9,995,859 B2   6/2018   Kamali et al.
(Continued)

FOREIGN PATENT DOCUMENTS

CN   102610923 A   7/2012
WO   2013033591 A1   3/2013
(Continued)

OTHER PUBLICATIONS

Minn, Khant & Anopchenko, Aleksei & Yang, Jingyi & Lee, Howard (Ho Wai), Excitation of epsilon-near-zero resonance in ultra-thin indium tin oxide shell embedded nanostructured optical fiber, Scientific Reports, Dec. 2017, pp. 1-14. (Year: 2017).*
(Continued)

*Primary Examiner* — Omar R Rojas

(74) *Attorney, Agent, or Firm* — Jackson Walker, LLP

(57) ABSTRACT

The present disclosure provides an optical waveguide design of a fiber modified with a thin layer of epsilon-near-zero (ENZ) material. The design results in an excitation of a highly confined waveguide mode in the fiber near the wavelength where permittivity of thin layer approaches zero. Due to the high field confinement within thin layer, the ENZ mode can be characterized by a peak in modal loss of the hybrid waveguide. Results show that such in-fiber excitation of ENZ mode is due to the coupling of the guided fundamental core mode to the thin-film ENZ mode. The phase matching wavelength, where the coupling takes place, varies depending on the refractive index of the constituents. These ENZ nanostructured optical fibers have many potential applications, for example, in ENZ nonlinear and magneto-optics, as in-fiber wavelength-dependent filters, and as subwavelength fluid channel for optical and bio-photonic sensing.

8 Claims, 24 Drawing Sheets
(24 of 24 Drawing Sheet(s) Filed in Color)

(56) References Cited

U.S. PATENT DOCUMENTS

| | | | |
|---|---|---|---|
| 2014/0099052 A1* | 4/2014 | Takaoka | G11B 7/128 385/2 |
| 2016/0306079 A1 | 10/2016 | Arbabi et al. | |
| 2016/0341859 A1 | 11/2016 | Shvets et al. | |
| 2016/0349594 A1 | 12/2016 | Wurtz et al. | |
| 2018/0045953 A1 | 2/2018 | Fan et al. | |
| 2019/0033682 A1 | 1/2019 | Kafaie et al. | |

FOREIGN PATENT DOCUMENTS

| | | | |
|---|---|---|---|
| WO | 2015179834 A1 | 11/2015 | |
| WO | 2015187221 A2 | 12/2015 | |
| WO | 2016126896 A1 | 8/2016 | |
| WO | 2018208774 A1 | 11/2018 | |
| WO | 2019118646 A1 | 6/2019 | |

OTHER PUBLICATIONS

Park, Junghyun & Kang, Juhyung & Liu, Xiaoge & Brongersma, Mark, Electrically Tunable Epsilon-Near-Zero (ENZ) Metafilm Absorbers. Scientific Reports, Nov. 2015, pp. 1-22. (Year: 2015).*

Campione, S., Wendt, J. R., Keeler, G. A., Luk, T. S., "Near-Infrared Strong Coupling between Metamaterials and Epsilon-near-Zero Modes in Degenerately Doped Semiconductor Nanolayers", ACS Photonics, (Jan. 14, 2016), pp. 293-297, vol. 3, [online], [retrieved on Oct. 19, 2020], Retrieved from the Internet <https://doi.org/10.1021/acsphotonics.5b00663>.

Javani, M. H., Stockman, M. I., "Real and Imaginary Properties of Epsilon-Near-Zero Materials", Physical Review Letters, (Sep. 2, 2016), 6 pages, vol. 117, No. 107404.

Kim, J., Dutta, A., Naik, G. V., Giles, A. J., Bezares, F. J., Ellis, C. T., Tischler, J. G., Mahmoud, A. M., Caglayan, H., Glembocki, O. J., Kildishev, A. V., Caldwell, J. D., Boltasseva, A., Engheta, N., "Role of epsilon-near-zero substrates in the optical response of plasmonic antennas" Optica, (Mar. 2016), pp. 339-346, vol. 3, No. 3.

Campione, S., Kim, I., Ceglia, D., Keeler, G. A., Luk, T. S., "Experimental verification of epsilon-near-zero plasmon polariton modes in degenerately doped semiconductor nanolayers" Optical Express, (2016), pp. 18782-18789, vol. 24.

Capretti, A., Wang, Y., Engheta, N., Dal Negro, L., "Comparative Study of Second-Harmonic Generation from Epsilon-Near-Zero Indium Tin Oxide and Titanium Nitride Nanolayers Excited in the Near-Infrared Spectral Range", Acs Photonics, (Oct. 5, 2015), pp. 1584-1591, vol. 2, [online], [retrieved on Oct. 19, 2020], Retrieved from the Internet <https://doi.org/10.1021/acsphotonics.5b00355>.

Caspani, L., Kaipurath, R. P. M., Clerici, M., Ferrera, M., Roger, T., Kim, J., Kinsey, N., Pietrzyk, M., Di Falco, A., Shalaev, V. M., Boltasseva, A., Faccio, D., "Enhanced Nonlinear Refractive Index in epsilon-Near-Zero Materials", Physical Review Letters, (Jun. 10, 2016), vol. 116, No. 233901.

Kinsey, N., Devault, C., Kim, J., Ferrera, M., Shalaev, V. M., Boltasseva, A., "Epsilon-near-zero Al-doped ZnO for ultrafast switching at telecom wavelengths", Optica, (Jul. 2015), pp. 616-622, vol. 2, No. 7.

Yang, Y. M., Kelley, K., Sachet, E., Campione, S., Luk, T. S., Maria, J. P., Sinclair, M. B., Brener, I., "Femtosecond optical polarization switching using a cadmium oxide-based perfect absorber", Nature Photonics, (May 1, 2017), pp. 390-395, vol. 11.

Alam, M. Z., De Leon, I., Boyd, R. W., "Large optical nonlinearity of indium tin oxide in its epsilon-near-zero region", Science, (May 13, 2016), pp. 795-797, vol. 352, Issue 6287, [online], [retrieved on Oct. 26, 2020], Retrieved from the Internet <https://science.sciencemag.org>.

Kim J., Dutta, A., Baik, G. V., Giles, A. J., Bezares, F. J., Elis, C., Tischler, J., Mahmoud, A. M., Caglayan, H., Glembocki, O. J., Kildishev, A. V., Caldwell, J. D., Boltasseva, A., Engheta, N., "Role of epsilon-near-zero substrates in the optical response of plasmonic antennas", Optica, (Mar. 2016), pp. 339-346, vol. 3, No. 3, [online], [retrieved on Oct. 26, 2020], Retrieved from the Internet <https://doi.org/10.1364/OPTICA.3.000339>.

Alu, A., Silveirinha, M. G., Salandrino, A., Engheta, N., "Epsilon-near-zero metamaterials and electromagnetic sources: Tailoring the radiation phase pattern", Physical Review, (2007), 13 pages, vol. B, No. 75, 155410.

Vasudev, A., Kang, J., Park, J., Liu, X., Brongersma, M., "Electro-optical modulation of a silicon waveguide with an "epsilon-near-zero" material", Optics Express, (Nov. 4, 2013), pp. 26387-26397, vol. 21, No. 22.

Zhaolin, L., Wangshi, Z., Kaifeng, S., "Ultracompact Electroabsorption Modulators Based on Tunable Epsilon-Near-Zero-Slot Waveguides" Photonics Journal, IEEE, (Jun. 2012), pp. 735-740, vol. 4, No. 3.

Feigenbaum, E., Diest, K., Atwater, H. A., "Unity-Order Index Change in Transparent Conducting Oxides at Visible Frequencies", Nano Letters, (May 18, 2010), pp. 2111-2116, vol. 10, [online], [retrieved on Oct. 26, 2020], Retrieved from the Internet <https://pubs.acs.org/sharingguidelines>.

Huang, Y. W., Lee, H. W., Sokhoyan, R., Pala, R. A., Thyagarajan, K., Han, S., Tsai, D. P., Atwater, H. A., "Gate-Tunable Conducting Oxide Metasurfaces", Nano Letters, (Aug. 26, 2016), pp. 5319-5325 vol. 16, [online], [retrieved on Oct. 26, 2020], Retrieved from the Internet <https://pubs.acs.org/sharingguidelines>.

Lee, H. W., Papadakis, G., Burgos, S. P., Chander, K., Kriesch, A., Pala, R., Peschel, U., Atwater, H. A., "Nanoscale Conducting Oxide PlasMOStor", Nano Letters, (Oct. 10, 2014), pp. 6463-6468, vol. 14, [online], [retrieved on Oct. 26, 2020], Retrieved from the Internet <https://doi.org/10.1021/nl502998z>.

Shi, K. F., Haque,. R., Zhao, B. Y., Zhao, R. C., Lu, Z. L., "Broadband electro-optical modulator based on transparent conducting oxide", Optics Letters, (Sep. 1, 2014), pp. 4978-4981, vol. 39, No. 17.

Cai, W., White, J. S., Brongersma, M. L., "Compact, High-Speed and Power-Efficient Electrooptic Plasmonic Modulators", Nano Letters, (2009), pp. 4403-4411, vol. 9, No. 12, [online], [retrieved on Oct. 26, 2020], Retrieved from the Internet <https://doi.org/10.1021/nl902701b>.

Koch, U., Hoessbacher, C., Niegemann, J., Hafner, C., Leuthold, J., "Digital Plasmonic Absorption Modulator Exploiting Epsilon-Near-Zero in Transparent Conducting Oxides", IEEE Photonics Journal, (Feb. 2016), pp. 1-13, vol. 8, No. 1.

Kwon, M. S., "Discussion of Two Ways of Optically Modeling Indium-Tin-Oxide Layers in Slot Waveguides for Waveguide Analysis", IEEE Photonics Journal, (Feb. 2016), 9 pages, vol. 8, No. 1, 4900108.

Lin, C., Helmy, A. S., "Dynamically reconfigurable nanoscale modulators utilizing coupled hybrid plasmonics", Scientific Reports, (Jul. 20, 2015),10 pages, vol. 5, 12313.

Pradhan, A. K., Mundle, R. M., Santiago, K., Skuza, J. R., Xiao, B., Song, K. D., Bahoura, M., Cheaito, R., Hopkins, P. E., "Extreme tunability in aluminum doped Zinc Oxide plasmonic materials for near-infrared applications", Scientific Reports, (Sep. 11, 2014), 7 pages, vol. 4, No. 6415.

Baek, J., You, J. B, Yu, K., "Free-carrier electro-refraction modulation based on a silicon slot waveguide with ITO", Optics Express, (Jun. 8, 2015), pp. 15863-15876, vol. 23, No. 12.

Ma, Z. Z., Li, Z. R., Liu, K., Ye, C. R., Sorger, V. J., "Indium-Tin-Oxide for High-performance Electro-optic Modulation", Nanophotonics, (Mar. 24, 2015), pp. 198-213, vol. 4.

Krasavin, A. V., Zayats, A. V., "Photonic Signal Processing on Electronic Scales: Electro-Optical Field-Effect Nanoplasmonic Modulator", Physical Review Letters, (Aug. 2012), 5 pages, vol. 109, No. 053901.

Liu, K., Ye, C. R., Khan, S., Sorger, V. J., "Review and perspective on ultrafast wavelength-size electro-optic modulators", Laser & Photonics Reviews, (2015), pp. 172-194, vol. 9, No. 2.

(56) References Cited

OTHER PUBLICATIONS

Huang, C., Lamond, R. J., Pickus, S. K., Li, Z. R., Sorger, V. J., "A Sub-lambda-Size Modulator Beyond the Efficiency-Loss Limit", IEEE Photonics Journal, (Aug. 2013), 12 pages, vol. 5, No. 4.
Melikyan, A., Lindenmann, N., Walheim, S., Leufke, P. M., Ulrich, S., Ye, J., Vincze, P., Hahn, H., Schimmel, T., Koos, C., Freude, W., Leuthold, J., "Surface plasmon polariton absorption modulator", Optical Express, 19, (Apr. 25, 2011), pp. 8855-8869, vol. 19, No. 9.
Wang, H., Zhang, J. W., Zhao, H., "Surface plasmon polariton excitation by electrostatic modulation and phase grating in indium-tin-oxide coated lithium niobate slabs", Journal of Applied Physics, (Aug. 15, 2015), 8 pages, vol. 118, 063102, AIP Publishing, LLC.
Babicheva, V. E., Kinsey, N., Naik, G. V., Ferrera, M., Lavrinenko, A. V., Shalaev, V. M., Boltasseva, A., "Towards CMOS-compatible nanophotonics: Ultra-compact modulators using alternative plasmonic materials", Optical Express, (Nov. 4, 2013), pp. 27326-27337, vol. 21.
Sorger, V., Lanzillotti-Kimura, N., Ma, R., Zhang, X., "Ultra-compact silicon nanophotonic modulator with broadband response", Nanophotonics, (2012), pp. 17-22, vol. 1.
Liu, X., Hang, J. H., Yuan, H., Park, J., Kim, S. J., Cui, Y., Hwang, H. Y., Brongersma, M. L., "Electrical tuning of a quantum plasmonic resonance", Nature Nanotechnology, (Sep. 2017), pp. 866-870, vol. 12.
Park, J., Kang, J. H., Kim, S. J., Liu, X. G., Brongersma, M. L., "Dynamic Reflection Phase and Polarization Control in Metasurfaces", Nano Letters, (2017), pp. 407-413, vol. 17, [online], [retrieved on Oct. 27, 2020], Retrieved from the Internet <https://doi.org/10.1021/acs.nanolett.6b04378>.
Li, H., Xu, S., Wang, H., Gu, Y., Lombardi, J. R., Xu, W., "Active-Tuned Plasmonic Angle Modulator of Light Beams for Potential Application of 3D Display", Acs Photonics, (Jul. 22, 2014), pp. 677-6828, vol. 1, ACS Publications.
Babicheva, V. E., Lavrinenko, A. V., "Plasmonic modulator optimized by patterning of active layer and tuning permittivity", Optics Communications, (Aug. 23, 2012), pp. 5500-5507, vol. 285.
Shi, K. F., Haque, R. R., Zhao, W. S., Zhao, R. C., Lu, Z. L., "Tunable plasmonic metamaterial based on transparent conducting oxide", Proceeding of Spie, (Mar. 17, 2014), 8 pages, vol. 8980.
Keller, J., "Air Force reaching out to industry for latest in high-power fiber lasers for airborne laser weapons", (Sep. 13, 2017), 20 pages, [online], [retrieved on Oct. 28, 2020], Retrieved from the Internet <http://www.militaryaerospace.com/articles/2017/09/laser-weapons-fiber-lasers-high-power.html>.
Extance, A., "Military technology: Laser weapons get real", Nature, (May 28, 2015), pp. 408-410, vol. 521.
Szondy, D., "Lockheed Martin to hand record 60-kW laser weapon over to the US Army", (Mar. 19, 2017), 7 pages, [online], [retrieved on Oct. 26, 2020], Retrieved from the Internet <https://newatlas.com/lockheed-martin-laser-60-kw/48467/>.
"Lockheed to adapt fiber laser weapon for fighter jet", (Nov. 7, 2017), 3 pages, [online], [retrieved on Oct. 26, 2020], Retrieved from the Internet <http://optics.org/news/8/11/8>.
Sprangle, P., Ting, A., Penano, J., Fischer, R., Hafizi, B., "Incoherent Combining and Atmospheric Propagation of High-Power Fiber Lasers for Directed-Energy Applications", IEEE Journal of Quantum Electronics, (Feb. 2009), pp. 138-148, vol. 45, No. 2.
"DARPA extends laser weapon range", (Mar. 11, 2014), 3 pages, [online], [retrieved on Oct. 22, 2020], Retrieved from the Internet <http://optics.org/news/5/3/13>.
Kinsey, N., Syed, A. A., Courtwright, D., Devault, C., Bonner, C.E., Gavrilenko, V. I., Shalaev, V., Hagan, D.J., Van Stryland, E.W., Boltasseva, A., "Effective third-order nonlinearities in metallic refractory titanium nitride thin films", Optics Express, (Oct. 2, 2015), pp. 2395-2403, vol. 5, No. 11, Optical Materials Express.
Hutchens, T. C., Darafsheh, A., Fardad, A., Antoszyk, A. N., Ying, H. S., Astratov, V. N., Fried, N. M., "Characterization of novel microsphere chain fiber optic tips for potential use in ophthalmic laser surgery", Journal of Biomedical Optics, (Jun. 2012), 8 pages, vol. 17, No. 6, 068004.
Hutchens, T. C., Darafsheh, A., Fardad, A., Antoszyk, A. N., Ying, H. S., Astratov, V. N. A, Fried, N. M., "Detachable fiber optic tips for use in thulium fiber laser lithotripsy", Journal of Biomedical Optics, (Mar. 2013), 9 pages, vol. 18, No. 3, 068004.
Jacobson, A. S., Woo, P., Shapshay, S. M., "Emerging technology: Flexible CO2 laser WaveGuide", Otolaryng Head and Neck, (2006), pp. 469-470, vol. 135.
Morin, F., Druon, F., Hanna, M., Georges, P., "Microjoule femtosecond fiber laser at 1.6 microm for corneal surgery applications", Optical Letters, (Jul. 1, 2009), 3 pages, vol. 34, No. 13.
Anopchenko, A., Lee, H. W. H., "ENZ conducting oxide broadband perfect absorbers with deep sub-wavelength thickness", Conference on Lasers and Electro-Optics, (2017), 2 pages, JTh2A.94.
Faez, S., Lahini, Y., Weidlich, S., Garmann, R. F., Wondraczek, K., Zeisberger, M., Schmidt, M. A., Orrit, M., Manoharan, V. N., "Fast, Label-Free Tracking of Single Viruses and Weakly Scattering Nanoparticles in a Nanofluidic Optical Fiber", ACS Nano, (Oct. 27, 2015), pp. 12349-12357, vol. 9, No. 21, [online], [retrieved on Oct. 27, 2020], Retrieved from the Internet <https://doi:10.1021/acsnano.5b05646>.
Vassant, S., Hugonin, J.-P., Marquier, F., Greffet, J.-J., "Berreman mode and epsilon near zero mode", Optics Express, (Oct. 4, 2012), pp. 23971-23977, 7 pages, vol. 20, No. 21.
Badsha, M. A., Jun, Y. C., Hwangbo, C. K., "Admittance matching analysis of perfect absorption in unpatterned thin films", Optics Communications, (Jul. 15, 2014), pp. 332, 206-213, vol. 332.
Powell, D. A., Alu, A., Edwards, B., Vakil, A., Kivshar, Y.S., Engheta, N., "Nonlinear control of tunneling through an epsilon-near-zero channel", Physical Review, (Jun. 29, 2009), 5 pages, vol. B, No. 79.
Gao, S. F., Wang, Y. Y., Liu, X. L., Ding, W., Wang, P., "Bending loss characterization in nodeless hollow-core anti-resonant fiber", Optics Express, (Jun. 27, 2016), pp. 14801-14811, vol. 24, No. 13.
Uebel, P., Gunendi, M. C., Frosz, M. H., Ahmed, G., Edavalath, N. N., Menard, J. M., Russell, P. S., "Broadband robustly single-mode hollow-core PCF by resonant filtering of higher-order modes", Optics Letters, (May 1, 2016), pp. 1961-1964, vol. 41, No. 9.
Wang, Y. Y., Wheeler, N. V., Couny, F., Roberts, P. J., Benabid, F., "Low loss broadband transmission in hypocycloid-core Kagome hollow-core photonic crystal fiber", Optical Letters, (Mar. 1, 2011), pp. 669-671, vol. 36, No. 5.
Scott, G. B., Lacklison, D. E., Ralph, H. I., Page, J. L., "Magnetic Circular-Dichroism and Faraday-Rotation Spectra of Y3fe5o12", Physical Review B, (Oct. 1, 1975), pp. 2562-2571, vol. 12, No. 7.
Bossini, D., Belotelov, V. I., Zvezdin, A. K., Kalish, A. N., Kimel, A. V., "Magnetoplasmonics and Femtosecond Optomagnetism at the Nanoscale", Acs Photonics, (Jun. 1, 2016), pp. 1385-1400, vol. 3, [online], [retrieved on Oct. 20, 2020], Retrieved from the Internet <https://doi.org/10.1021/acsphotonics.6b00107>.
Armelles, G., Cebollada, A., Garcia-Matin, A., Gonzalez, M. U., "Magnetoplasmonics: Combining Magnetic and Plasmonic Functionalities", Advanced Optical Materials, (2013), pp. 10-35, vol. 1.
Maksymov, I. S., "Magneto-Plasmonics and Resonant Interaction of Light with Dynamic Magnetisation in Metallic and All-Magneto-Dielectric Nanostructures", Nanomaterials-Basel, (Apr. 9, 2015), pp. 577-613, vol. 5.
Belotelov, V. I., Akimov, I. A., Pohl, M., Kotov, V. A., Kasture, S., Vengurlekar, A. S., Gopal, A. V., Yakovlev, D. R., Zvezdin, A. K., Bayer, M., "Enhanced magneto-optical effects in magnetoplasmonic crystals", Nature Nanotechnology, (Jun. 2011), pp. 370-376, vol. 6.
Chin, J. Y., Steinle, T., Wehlus, T., Dregely, D., Weiss, T., Belotelov, V. I., Stritzker, B., Giessen, H., "Nonreciprocal plasmonics enables giant enhancement of thin-film Faraday rotation", Nature Communications, (Mar. 19, 2013), 6 pages, vol. 4, No. 1599.

(56) References Cited

OTHER PUBLICATIONS

Grunin, A. A., Zhdanov, A. G., Ezhov, A. A., Ganshina, E. A., Fedyanin, A. A., "Surface-plasmon-induced enhancement of magneto-optical Kerr effect in all-nickel subwavelength nanogratings", Applied Physics Letters, (Dec. 30, 2010), 4 pages, vol. 97, No. 261908.

Ctistis, G., Papaioannou, E., Patoka, P., Gutek, J., Fumagalli, P., Giersig, M., "Optical and Magnetic Properties of Hexagonal Arrays of Subwavelength Holes in Optically Thin Cobalt Films", Nano Letters, (Jan. 2009), 6 pages, vol. 9, No. 1, [online], [retrieved on Oct. 20, 2020], Retrieved from the Internet < https://doi.org/10.1021/hl801811t>.

Strelniker, Y. M., Bergman, D. J., "Optical transmission through metal films with a subwavelength hole array in the presence of a magnetic field", Physical Review B, (May 15, 1999), pp. 12763-12766, vol. 59, No. 20.

Sepulveda, B., Gonzalez-Diaz, J. B., Garcia-Martin, A., Lechuga, L. M., Amelles, G., "Plasmon-Induced Magneto-Optical Activity in Nanosized Gold Disks", Physical Review Letters, (Apr. 9, 2010), 4 pages, vol. 104, No. 147401.

Feng, H. Y., Luo, F., Kekesi, R., Granados, D., Meneses-Rodriguez, D., Garcia, J. M., Garcia-Martin, A., Armelles, G., Cebollada, A., "Magnetoplasmonic Nanorings as Novel Architectures with Tunable Magneto-optical Activity in Wide Wavelength Ranges", Advanced Optical Materials, (2014), pp. 612-617, vol. 2.

Gonzalez-Diaz, J. B., Sepulveda, B., Garcia-Martin, A., Armelles, G., "Cobalt dependence of the magneto-optical response in magnetoplasmonic nanodisks", Applied Physics Letters, (Jul. 30, 2010), 4 pages, vol. 97, No. 043114.

Du, G. X., Mori, T., Suzuki, M., Saito, S., Fukuda, H., Takahashi, M., "Evidence of localized surface plasmon enhanced magneto-optical effect in nanodisk array", Applied Physics Letters, (Feb. 25, 2010), 4 pages, vol. 96, No. 081915.

Armelles, G., Cebollada, A., Garcia-Martin, A., Garcia-Martin, J. M., Gonzalez, M. U., Gonzalez-Diaz, J. B., Ferreiro-Vila, E., Torrado, J. F., "Magnetoplasmonic nanostructures: systems supporting both plasmonic and magnetic properties", Journal of Optics A—Pure Applied Optics, (Sep. 17, 2009), 11 pages, vol. 11, No. 114023.

Hermann, C., Kosobukin, V. A., Lampel, G., Peretti, J., Safarov, V. I., Bertrand, P., "Surface-enhanced magneto-optics in metallic multilayer films", Physical Review B, (Nov. 29, 2001), vol. 64, No. 235422.

Armelles, G., Gonzalez-Diaz, J. B., Garcia-Martin, A., Garcia-Martin, J. M., Cebollada, A., Gonzalez, M. U., Acimovic, S., Cesario, J., Quidant, R., Badenes, G., "Localized surface plasmon resonance effects on the magneto-optical activity of continuous Au/Co/Au trilayers", Optics Express, (Sep. 28, 2008), 16104-16112, vol. 16, No. 20.

Razdolski, I., Makarov, D., Schmidt, O. G., Kirilyuk, A., Rasing, T., Temnov, V. V., "Nonlinear Surface Magnetoplasmonics in Kretschmann Multilayers", ACS Photonics, (Jul. 19, 2016), pp. 179-183, vol. 3, [online], [retrieved on Oct. 20, 2020], Retrieved from the Internet <https://doi.org/10.1021/acsphotonics.5b00504>.

Temnov, V. V., Armelles, G., Woggon, U., Guzatov, D., Cebollada, A., Garcia-Martin, A., Garcia-Martin, J. M., Thomay, T., Leitenstorfer, A., Bratschitsch, R., "Active magneto-plasmonics in hybrid metal-ferromagnet structures", Nature Photonics, (Jan. 17, 2010), pp. 107-111, vol. 4.

Kreilkamp, L. E., Belotelov, V. I., Chin, J. Y., Neutzner, S., Dregely, D., Wehlus, T., Akimov, I. A., Bayer, M., Stritzker, B., Giessen, H., "Waveguide-Plasmon Polaritons Enhance Transverse Magneto-Optical Kerr Effect", Physical Review X, (Nov. 25, 2013), 7 pages, vol. 3, No. 041019.

Temnov, V. V., "Ultrafast acousto-magneto-plasmonics", Nature Photonics, (Nov. 2012), pp. 728-736, vol. 6.

Davoyan, A. R., Engheta, N., "Theory of Wave Propagation in Magnetized Near-Zero-Epsilon Metamaterials Evidence for One-Way Photonic States and Magnetically Switched Transparency and Opacity", Physical Review Letters, (Dec. 20, 2013), 5 pages, vol. No. 111, 257401.

Abdi-Ghaleh, R., Suldozi, R., "Magneto-optical characteristics of layered Epsilon-Near-Zero metamaterials", Superlattices and Microstructures, (2016), pp. 242-249, vol. 97.

Schmidt, M. A., Wondraczek, L., Lee, H. W., Granzow, N., Da, N., Russell, P. S., "Complex Faraday Rotation in Microstructured Magneto-optical Fiber Waveguides", Advanced Materials, (2011), pp. 2681-2688, vol. 23.

Sokhoyan, R., Atwater, H. A., "Quantum optical properties of a dipole emitter coupled to an epsilon-near-zero nanoscale waveguide", Optics Express, (Dec. 13, 2013), pp. 32279-32290, vol. 21, No. 26.

Galfsky, T., Sun, Z., Jacob, Z., Menon, V. M., "Preferential emission into epsilon-near-zero metamaterial [Invited]", Optical Materials Express, (Dec. 1, 2015), pp. 2878-2883, vol. 5, No. 12.

Li, L., Wang, W., Luk, T. S., Yang, X. D., Gao, J., "Enhanced Quantum Dot Spontaneous Emission with Multilayer Metamaterial Nanostructures", ACS Photonics, (Mar. 2, 2017), pp. 501-508, vol. 4, [online], [retrieved on Oct. 20, 2020], Retrieved from the Internet <https://doi.org/10.1021/acsphotonics.6b01039>.

Mac Ciarnain, R., Michaelis, D., Wehlus, T., Rausch, A. F., Wehrmeister, S., Schmidt, T. D., Brutting, W., Danz, N., Brauer, A., Tunnermann, A., "Plasmonic Purcell effect reveals obliquely ordered phosphorescent emitters in Organic LEDs", Scientific Reports, (May 12, 2017), 9 pages, vol. 7, No. 1826.

Caligiuri, V., Palei, M., Imran, M., Manna, L., Krahne, R., "Planar Double-Epsilon-Near-Zero Cavities for Spontaneous Emission and Purcell Effect Enhancement", ACS Photonics, (Mar. 23, 2018), pp. 2287-2294, vol. 5, [online], [retrieved on Oct. 20, 2020], Retrieved from the Internet <https://doi.org/10.1021/acsphotonics.8b00121>.

Guo, Xiaohui, Yang, Xinghua, Li, Song, Liu, Zhihai, Hu, Minggang, Qu, Bin, Yuan, Libo, "An integrated nematic liquid crystal in-fiber modulator derivates from capillary optical fiber", Elsevier, Feb. 4, 2016, pp. 249-253, Optics Communications.

Myren, N., Margulis, W., "All-Fiber Electrooptical Mode-Locking and Tuning", IEEE Photonics Technology Letters, Oct. 2005, pp. 2047-2049, vol. 17, No. 10.

Pu, S., Chen, X., Chen, Y., Xu, Y., Liao, W., Chen, L., Xia, Y., "Fiber-optic evanescent field modulator using a magnetic fluid as the classing", Journal of Applied Physics, May 15, 2006, 5 pages, American Institute of Physics.

Zhou, F., Hao, R., Jin, X., Zhang, X., Li, E., "A Graphene-Enhanced Fiber-Optic Phase Modulator with Large Linear Dynamic Range", IEEE Photonics Technology Letters, Sep. 15, 2014, pp. 1867-1870, vol. 26, No. 18.

Yu, N., Capasso, F., "Flat optics with designer metasurfaces", Nature Materials, Jan. 23, 2014, pp. 139-150, vol. 13, Macmillan Publishers Limited.

Kildishev, A.V., Boltasseva, A., Shalaev, V. M., "Planar Photonics with Metasurfaces", Mar. 15, 2013, 8 pages. Science, vol. 339, AAAS.

Meinzer, N., Barnes, W. L., Hooper, I. R., "Plasmonic meta-atoms and metasurfaces", Dec. 27, 2014, pp. 889-898, vol. 8, Macmillan Publishers Limited.

Yu, N., Genevet, P., Kats, M. A., Aieta, F.,Tetienne, J. P., Capasso, F., Gaburro, Z., "Light Propagation with Phase Discontinuities: Generalized Laws of Reflection and Refraction", Science, Oct. 21, 2011, pp. 333-337, vol. 334.

Aieta, F., Genevet, P., Kats, M.A., Yu, N., Blanchard, R., Gaburro, Z., Capasso, F., "Aberration-Free Ultrathin Flat Lenses and Axicons at Telecom Wavelengths Based on Plasmonic Metasurfaces", Nano Letters, pp. 4932-4936, vol. 12, ACS Publications.

Kang, M., Feng, T., Wang, H,, Li., J., "Wave front engineering from an array of thin aperture antennas", Optics Express, Jul. 2, 2012, pp. 15882-15890, vol. 20 No. 14.

Genevet, P., Yu, N., Aieta, F., Lin, J., Kats, M. A., Blanchard, R., Scully, M.O., Gaburro, Z., Capasso, F., "Ultra-thin plasmonic optical vortex plate based on phase discontinuities", Jan. 3, 2012, 4 pages, American Institute of Physics.

Chen,W. T., Yang, K., Wang, C., Huang, Y., Sun, G., Chiang, I., Liao, C.Y., Hsu, W., Lin, H.T., Sun, S., Zhou, L., Liu, A. Q., Tsai, D. P., "High-Efficiency Broadband Meta-Hologram with Polarization-Controlled Dual Images", NANO Letters, Dec. 13, 2013, pp. 225-230, vol. 14, ACS Publications.

(56) References Cited

OTHER PUBLICATIONS

Ni, X., Kildishev, A.V., Shalaev, V. M., "Metasurface holograms for visible light", Nature Communications, Nov. 15, 2013, 6 pages, Macmillan Publishers Limited.
Zheng, G., Muhlenbernd, H., Kenney, M., Li, G., Zentgraf, T., Zhang, S., "Metasurface holograms reaching 80% efficiency", Nature Nanotechnology, Feb. 25, 2015, 5 pages, Macmillan Publishers Limited.
Genevet, P., Capasso, F., "Holographic optical metasurfaces: a review of current progress",Reports on Progress in Physics, Jan. 15, 2015, 19 pages, vol. 78, IOP Publishing Ltd.
Huang, L., Chen, X., Muhlenbernd, H., Zhang, H., Chen, S., Bai, B., Tan, Q., Jin, G., Chea, K., Qui, C., Li, J., Zentgraf, T., Zhang, S., "Three-dimensional optical holography using a plasmonic metasurface", Nature Communications, (Nov. 15, 2013), 8 pages, Macmillan Publishers Limited.
Lin, J., Mueller, B., Wang, Q., Yuan, G., Antoniou, N., Yuan, X., Capasso, F., "Polarization-Controlled Tunable Directional Coupling of Surface Plasmon Polaritons", Science, Apr. 19, 2013, pp. 331-334, vol. 340.
Jin, J., Luo, J., Zhang, X.,Gao, H., Li, X., Pu, M., Gao, P., Zhao, Z., Luo, X., "Generation and detection of orbital angular momentum via metasurface", Scientific Reports, Apr. 7, 2016, 7 pages.
Li, G., Kang, M., Chen, S., Zhang, S., Pun, E., Cheah, K.W., Li, J., "Spin-Enabled Plasmonic Metasurfaces for Manipulating Orbital Angular Momentum of Light", Nano Letters, Aug. 21, 2013, 4148-4151, vol. 13, [online], [retrieved on Oct. 23, 2020], Retrieved from the Internet <https://doi.org/10.1021/nl401734r>, ACS Publications.
Karimi, E., Schulz, S. A., I. D. Leon, H. Qassim, J. Upham, R. W. Boyd, Generating optical orbital angular momentum at visible wavelengths using a plasmonic metasurface, Light: Science & Applications, (May 9, 2014), vol. 3, No. e167.
Buchnev, O., Podoliak, N., Kaczmarek, M., Zheludev, N., Fedotov, V., "Electrically Controlled Nanostructured Metasurface Loaded with Liquid Crystal: Toward Multifunctional Photonic Switch", Advanced Optical Materials, (2015), pp. 674-679, vol. 3, Wiley-VCH Verlag GmbH & Co. KGaA, Weinheim.
Lee, J., Jung, S., Chen, P., Lu, F., Demmerle, F., Boehm, G., Amann, M., Alu, A., Belkin, M., "Ultrafast Electrically Tunable Polaritonic Metasurfaces", Advanced Optical Materials, (2014), pp. 1057-1063, vol. 2.
Sautter, J., Staude, I., Decker, M., Rusak, E., Neshev, D., Brener, I., Kivshar, Y., "Active Tuning of All-Dielectric Metasurfaces", Acs Nano, (2015), pp. 4308-4315, vol. 9, [online], [retrieved on Oct. 23, 2020], Retrieved from the Internet <https://doi.org/10.1021/acsnano.5b00723>.
Dabidian, N., Kholmanov, I., Khanikaev, A. B., Tatar, K., Trendafilov, S., Mousavi, S. H., Magnuson, C., Ruoff, R. S., Shvets, G., "Electrical Switching of Infrared Light Using Graphene Integration with Plasmonic Fano Resonant Metasurfaces", Acs Photonics, (2015), pp. 216-227, vol. 2, [online], [retrieved on Oct. 23, 2020], Retrieved from the Internet <https://doi.org/10.1021/ph5003279>.
Decker, M., Kremers, C., Minovich, A., Staude, I., Miroshnichenko, A., Chigrin, D., Neshev, D., Jagadish, C., Kivshar, Y., "Electro-optical switching by liquid-crystal controlled metasurfaces", Optics Express, (Apr. 8, 2013), pp. 8879-8885, vol. 21, No. 7.
Waters, R. F., Hobson, P. A., MacDonald, K. F., Zheludev, N. I., "Optically switchable photonic metasurfaces", Applied Physics Letters, (Aug. 24, 2015), 5 pages, vol. 107, No. 081102.
Yao, Y., Shankar, R., Kats, M., Song, Y., Kong, J., Loncar, M., Capasso, F., "Electrically Tunable Metasurface Perfect Absorbers for Ultrathin Mid-Infrared Optical Modulators", Nano Letters, (Oct. 13, 2014), pp. 6526-6532, vol. 14, [online], [retrieved on Oct. 23, 2020], Retrieved from the Internet <https://doi.org/10.1021/hl503104n>.
Park, J., Kang, J. H., Liu, X., Brongersma, M. L., "Electrically Tunable Epsilon-Near-Zero (ENZ) Metafilm Absorbers", Scientific Reports, (Nov. 9, 2015), 9 pages, vol. 5, 15754.

Olivieri, A., Chen, C., Hassan, S., Lisicka-Skrzek, E., Tait, R. N., Berini, P., "Plasmonic Nanostructured Metal-Oxide-Semiconductor Reflection Modulators", Nano Letters, (Mar. 2, 2015), pp. 2304-2311, vol. 15, [online], [retrieved on Oct. 23, 2020], Retrieved from the Internet <doi.org/10.1021/nl504389f>.
Jun, Y. C., Reno, J., Ribaudo, T., Shaner, E., Greffet, J. J, Vassant, S., Marquier, F., Sinclair, M., Brener, I., "Epsilon-Near-Zero Strong Coupling in Metamaterial-Semiconductor Hybrid Structures", Nano Letters, (Oct. 14, 2013), pp. 5391-5396, vol. 13, [online], [retrieved on Oct. 23, 2020], Retrieved from the Internet <https://doi.org/10.1021/nl402939t.
Yao, Y., Shankar, R., Kats†, M. A., Song, Y., Kong, J., Loncar, M., Capasso, F., "Electrically Tunable Metasurface Perfect Absorbers for Ultrathin Mid-Infrared Optical Modulators", Nano Letters, (Oct. 13, 2014), pp. 6526-6532, vol. 14, [online], [retrieved on Oct. 23, 2020], Retrieved from the Internet <https://doi.org/10.1021/hl503104n>.
Russell, P., "Photonic crystal fibers", Science, (Jan. 17, 2003), pp. 358-362, vol. 299, [online], [retrieved on Oct. 23, 2020], Retrieved from the Internet <https://doi.org/10.1126/science.1079280>.
Birks, T. A., Knight, J. C., Russell, P. S., "Endlessly single-mode photonic crystal fiber", Optics Letters, (Jul. 1, 1997), pp. 961-963, vol. 22, No. 13.
Valtna-Lukner, H., Repan, J., Valdma, S. M., Piksarv, P., "Endlessly single-mode photonic crystal fiber as a high resolution probe", Applied Optics, (Nov. 20, 2016), pp. 9407-9411, vol. 55, No. 33.
Reeves, W. H., Skryabin, D. V., Biancalana, F., Knight, J. C., Russell, P. S., Omenetto, F. G., Efimov, A., Taylor, A. J., "Transformation and control of ultra-short pulses in dispersion-engineered photonic crystal fibres", Nature, (Jul. 31, 2003) pp. 511-515, vol. 424.
Zhang, Z., Senel, C., Hamid, R., Ilday, F. O., "Sub-50 fs Yb-doped laser with anomalous-dispersion photonic crystal fiber", Optical Letters, (Mar. 15, 2013), pp. 956-958, vol. 38, No. 6.
Biancalana, F., Skryabin, D. V., Russell, P. S., "Four-wave mixing instabilities in photonic-crystal and tapered fibers", Physical Review, (Oct. 13, 2003), 8 pages, vol. 68.
Skryabin, D. V., Luan, F., Knight, J. C., Russell, P. S., "Soliton self-frequency shift cancellation in photonic crystal fibers", Science, (Sep. 19, 2003), pp. 1705-1708, vol. 301, [online], [retrieved on Oct. 23, 2020], Retrieved from the Internet <https://doi.org/10.1126/science.1088516>.
Kim, S. E., Kim, B. H., Lee, C. G., Lee, S., Oh, K., Kee, C. S., "Elliptical defected core photonic crystal fiber with high birefringence and negative flattened dispersion", Optics Express, (Jan. 16, 2012), pp. 1385-1391, vol. 20, No. 2.
Yang, T., Wang, E., Jiang, H., Hu, Z., Xie, K., "High birefringence photonic crystal fiber with high nonlinearity and low confinement loss" Optics Express, (Apr. 6, 2015), pp. 8329-8337, vol. 23, No. 7.
Vogl, U., Peuntinger, C., Joly, N. Y.,Russell, P. S., Marquardt, C., Leuchs, G., "Atomic mercury vapor inside a hollow-core photonic crystal fiber", Optics Express, (Nov. 17, 2014), pp. 29375-29381, vol. 22, No. 24.
Frosz, M. H., Nold, J., Weiss, T., Stefani, A., Babic, F., Rammler, S., Russell, P. S., "Five-ring hollow-core photonic crystal fiber with 1.8 dB/km loss", Optics Letters, (Jul. 1, 2013), pp. 2215-2217, vol. 38, No. 13, Optical Society of America.
Ghenuche, P., Rammler, S., Joly, N. Y., Scharrer, M., Frosz, M., Wenger, J., Russell, P. S., Rigneault, H., "Kagome hollow-core photonic crystal fiber probe for Raman spectroscopy", Optics Letters, (Nov. 1, 2012), pp. 4371-4373, vol. 37, No. 21.
Menard, J. M., Russell, P. S., "Phase-matched electric-field-induced second-harmonic generation in Xe-filled hollow-core photonic crystal fiber", Optics Letters, (Aug. 1, 2015), pp. 3679-3682, vol. 40, No. 15.
Jiang, X., Euser, T. G., Abdolvand, A., Babic, F., Tani, F., Joly, N. Y., Travers, J. C., Russell, P. S., "Single-mode hollow-core photonic crystal fiber made from soft glass", Optics Express, (2011), pp. 15438-15444, vol. 19, No. 16.
Lee, H. W., Schmidt, M. A., Uebel, P., Tyagi, H., Joly, N. Y., Scharrer, M., Russell, P. S., "Optofluidic refractive-index sensor in step-index fiber with parallel hollow micro-channel", Optics Express, (2011), pp. 8200-8207, vol. 19, No. 9.

(56) References Cited

OTHER PUBLICATIONS

Tyagi, H. K., Lee, H. W., Uebel, P., Schmidt, M. A., Joly, N., Scharrer, M., Russell, P. S., "Plasmon resonances on gold nanowires directly drawn in a step-index fiber", Optics Letters, (2010), pp. 2573-2575, vol. 35, No. 15.

Lee, H. W., Schmidt, M. A., Russell, R. F., Joly, N. Y., Tyagi, H. K., Uebel, P., Russell, P. S. J., "Pressure-assisted melt-filling and optical characterization of Au nano-wires in microstructured fibers", Optics Express, (2011), pp. 12180-12189, vol. 19, No. 12.

Faez, S., Lahini, Y., Weidlich, S., Garmann, R. F., Wondraczek, K., Zeisberger, M., Schmidt, M. A., Orrit, M., Manoharan, V. N., "Fast, Label-Free Tracking of Single Viruses and Weakly Scattering Nanoparticles in a Nanofluidic Optical Fiber", ACS Nano, (2015), pp. 12349-12357, vol. 9, (2015) [online], [retrieved on Oct. 30, 2020], Retrieved from the Internet <https://doi.org/10.1021/acsnano.5b05646>.

Tuniz, A., Chemnitz, M., Dellith, J., Weidlich, S., Schmidt, M. A., "Hybrid-Mode-Assisted Long-Distance Excitation of Short-Range Surface Plasmons in a Nanotip-Enhanced Step-Index Fiber", Nano Letters, (2017), pp. 631-637, vol. 17.

Alu, A., Engheta, N., "Dielectric sensing in -near-zero narrow waveguide channels", Physical Review B, (Jul. 3, 2008), 5pages, vol. 78, No. 045102.

Ziolkowski, R.W.., "Propagation in and scattering from a matched metamaterial having a zero index of refraction", Physical Review E, (Oct. 21, 2004), 12 pages, vol. 70, No. 046608.

Tuniz, C., Jain, C., Weidlich, S., Schmidt, M. A., "Broadband azimuthal polarization conversion using gold nanowire enhanced step-index fiber", Optics Letters, (Feb. 1, 2016), pp. 448-451, vol. 41, No. 3.

Schmidt, M. A., Argyros, A., Sorin, F., "Hybrid Optical Fibers—An Innovative Platform for In-Fiber Photonic Devices", Advanced Optical Materials, (2016), pp. 13-36, vol. 4.

Schmidt, M. A., Russell, P. S., "Long-range spiralling surface plasmon modes on metallic nanowires", Optics Express, (Sep. 1, 2008), pp. 13617-13623, vol. 16, No. 18.

Lee, H. W., Schmidt, M. A., Tyagi, H. K., Sempere, L. P., Russell, P. S. J., "Polarization-dependent coupling to plasmon modes on submicron gold wire in photonic crystal fiber", Applied Physics Letters, (Sep. 15, 2008), 4 pages, vol. 93.

Lee, H. W., Schmidt, M. A., Russell, P. S. J., "Excitation of a nanowire "molecule" in gold-filled photonic crystal fiber", Opt. Lett. 37, (2012), pp. 2946-2948.

Ubel, P., Schmidt, M. A., Lee, H. W., Russell, P. S., "Polarisation-resolved near-field mapping of a coupled gold nanowire array", Optics Express, (Dec. 17, 2012), pp. 28409-28417, vol. 20.

Kim, H., An, H., Kim, J., Lee, S., Park, K., Hong, S., Vazquez-Zuniga, L. A., Lee, S. Y., Lee, B., Jeong, Y. J, "Corrugation-assisted metal-coated angled fiber facet for wavelength-dependent off-axis directional beaming", Optics Express, (Apr. 3, 2017), pp. 8366-8385, vol. 25, No. 7.

Jia, P. P., Yang, J., "A plasmonic optical fiber patterned by template transfer as a high-performance flexible nanoprobe for real-time biosensing", Nanoscale, (May 16, 2014), pp. 8836-8843, vol. 6, [online], [retrieved on Oct. 24, 2020], Retrieved from the Internet <DOI: 10.1039/c4nr01411a>.

Jia, P. P., Yang, J., "Integration of large-area metallic nanohole arrays with multimode optical fibers for surface plasmon resonance sensing", Applied Physics Letters, (Jun. 19, 2013), 4 pages, vol. 102, No. 3.

Zhang, Z. J., Chen, Y. Y., Liu, H. J., Bae, H. D., Olson, D. A., Gupta, A. K., Yu, M., "On-fiber plasmonic interferometer for multi-parameter sensing", Optics Express, (Apr. 20, 2015), pp. 10732-10740, vol. 23, No. 8.

Reader-Harris, P., Di Falco, A., "Nanoplasmonic Filters for Hollow Core Photonic Crystal Fibers", Acs Photonics, (Sep. 16, 2014), pp. 985-989, vol. 1, [online], [retrieved on Oct. 23, 2020], Retrieved from the Internet <https://doi.org/10.1021/ph500222w>.

Arabi, H. E., Joe, H. E., Nazari, T., Min, B. K., Oh,, "A high throughput supra-wavelength plasmonic bull's eye photon sorter spatially and spectrally multiplexed on silica optical fiber facet", Optics Express, (2013), pp. 28083-28094, vol. 21.

Du, J., Chen, S., Liu, J., Zhu, L., Zhao, Y., Wang, J., "Design and Fabrication of Metasurface on Conventional Optical Fiber Facet for Linearly Polarized Mode (LP11) Generation at Visible Light Wavelength", CLEO: Applications and Technology, (2016), 2 pages.

Liu, Y. X., Xu, H., Stief, F., Zhitenev, N., Yu, M., "Far-field superfocusing with an optical fiber based surface plasmonic lens made of nanoscale concentric annular slits", Optics Express, (Oct. 10, 2011), pp. 20233-20243, vol. 19, No. 1.

Saleh, A. A. E., Sheikhoelislami, S., Gastelum, S., Dionne, J. A., "Grating-flanked plasmonic coaxial apertures for efficient fiber optical tweezers", Optics Express, (Sep. 5, 2016), pp. 20593-20603, vol. 24, No. 18.

Principe, M., Consales, M., Micco, A., Crescitelli, A., Castaldi, G., Esposito, E., La Ferrara, V., Cutolo, A., Galdi, V., Cusano, A., "Optical fiber meta-tips", Light: Science & Applications, (Mar. 10, 2017), 10 pages, vol. 6, No. e16226.

Yu, N. F., Capasso, F., "Optical Metasurfaces and Prospect of Their Applications Including Fiber Optics" Journal Lightwave Technology, (Jun. 15, 2015), vol. 33, No. 12.

Naik, G. V., Shalaev, V. M., Boltasseva, A., "AlterVolnative Plasmonic Materials: Beyond Gold and Silver", Advanced Materials, (2013), pp. 3264-3294, vol. 25.

Boltasseva, A., Atwater, H. A., "Low-Loss Plasmonic Metamaterials", Science, (Jan. 21, 2011), pp. 290-291, vol. 331, [online], [retrieved on Oct. 26, 2020], Retrieved from the Internet <https://doi.org/10.1126/science.1198258>.

Naik, G. V., Kim, J., Boltasserva, A., "Oxides and nitrides as alternative plasmonic materials in the optical range", Optical Materials Express, (Oct. 1, 2011), pp. 1090-1099 vol. 1,No. 6.

Li, S. Q., Guo, P. J., Zhang, L. X., Zhou, W., Odom, T. W., Seideman, T., Ketterson, J. B., Chang, R. P. H., "Infrared Plasmonics with Indium-Tin-Oxide Nanorod Arrays", Acs Nano, (Oct. 21, 2011), pp. 9161-9170, vol. 5, No. 11, [online], [retrieved on Oct. 26, 2020], Retrieved from the Internet <https://pubs.acs.org/>.

Guler, U., Naik, G. V., Boltasseva, A., Shalaev,V. M., Kildishev, A. V., "Performance analysis of nitride alternative plasmonic materials for localized surface plasmon applications", Applied Phys B-Lasers and Optics, (2012), pp. 285-291, vol. 107, [online], [retrieved on Oct. 26, 2020], Retrieved from the Internet <https://doi.org/10.1007/s00340-012-4955-3>.

Dominici, L., Michelotti, F., Brown, T. M., Reale, A., Di Carlo, A., "Plasmon polaritons in the near infrared on fluorine doped tin oxide films", Optics Express, (Jun. 8, 2009), pp. 10155-10167, vol. 17, No. 12.

Franzen, S., Rhodes, C., Cerruti, M., Gerber, R. W., Losego, M., Maria, J. P., Aspnes, D. E., "Plasmonic phenomena in indium tin oxide and ITO-Au hybrid films", Optics Letters, (Sep. 15, 2009), pp. 2867-2869, vol. 34, No. 18.

Kim, J., Naik, G. V., Emani, N. K., Guler, U., Boltasseva, A., "Plasmonic Resonances in Nanostructured Transparent Conducting Oxide Films". IEEE Journal of Selected Topics in Quantum Electronics, (Jun. 2013), 7 pages, vol. 19, No. 3, [online], [retrieved on Oct. 23, 2020], Retrieved from the Internet <https://doi.org/10.1109/JSTQE.2013.2238611>.

Liu, X. G., Park, J., Kang, J. H., Yuan, H. T., Cui, Y., Hwang, H. Y., Brongersma, M. L., "Quantification and impact of nonparabolicity of the conduction band of indium tin oxide on its plasmonic properties", Applied Physics, Letters, (Nov. 7, 2014), 6 pages, vol. 105, No. 181117.

West, P. R., Ishii, S., Naik, G. V., Emani, N. K., Shalaev, V. M., Boltasseva, A., "Searching for better plasmonic materials", Laser & Photonics Reviews, (Mar. 1, 2010), pp. 795-808, vol. 4, No. 6, [online], [retrieved on Oct. 23, 2020], Retrieved from the Internet <https://doi.org/10.1002/lpor.200900055>.

Verma, R. K., Gupta, B. D., "Surface plasmon resonance based fiber optic sensor for the IR region using a conducting metal oxide film", J. Opt. Soc. Am. A, (Apr. 2010), pp. 846-851, vol. 27, No. 4, Optical Society of America.

(56) References Cited

OTHER PUBLICATIONS

Rhodes, C., Franzen, S., Maria, J. P., Losego, M., Leonard, D. N., Laughlin, B., Duscher, G., Weibel, S., "Surface plasmon resonance in conducting metal oxides", Journal of Applied Physics, (Sep. 8, 2006), 5 pages, vol. 100, [online], [retrieved on Oct. 23, 2020], Retrieved from the Internet <https://doi.org/10.1063/1.2222070>.

Michelotti, F., Dominici, L., Descrovi, E., Danz, N., Menchini, F., "Thickness dependence of surface plasmon polariton dispersion in transparent conducting oxide films at 1.55 mu m", Optics Letters, (Mar. 15, 2009), pp. 839-841, vol. 34, No. 6.

Abb, M., Sepulveda, B., Chong, H. M. H., Muskens, O. L., "Transparent conducting oxides for active hybrid metamaterial devices", J Optics-Uk , (Jul. 27, 2012), 8 pages, vol. 14, No. 114007, [online], [retrieved on Oct. 23, 2020], Retrieved from the Internet <https://doi.org/10.1088/2040-8978/14/11/114007>.

Noginov, M. A., Gu, L., Livenere, J., Zhu, G., Pradhan, A. K., Mundle,R., Bahoura, M., Bamakov, Y. A., Podolskiy, V. A., "Transparent conductive oxides: Plasmonic materials for telecom wavelengths", Applied Physics Letters, (Ju. 11, 2011), 4 pages, vol. 99, No. 021101.

Buonsanti, R., Llordes, A., Aloni, S., Helms, B. A., Milliron, D. J., "Tunable Infrared Absorption and Visible Transparency of Colloidal Aluminum-Doped Zinc Oxide Nanocrystals", Nano Letters, (Oct. 4, 2011), pp. 4706-4710, vol. 11, [online], [retrieved on Oct. 23, 2020], Retrieved from the Internet <https://doi.org/10.1021/nl203030f>.

Traviss, D., Bruck, R., Mills, B., Abb, M., Muskens, O. L., "Ultrafast plasmonics using transparent conductive oxide hybrids in the epsilon-near-zero regime", Applied Physics Letters, (Mar. 27, 2013), 8 pages, vol. 102, No. 121112.

Calzolari, A., Ruini A., Catellani, A., "Transparent Conductive Oxides as Near-IR Plasmonic Materials: The Case of Al-Doped ZnO Derivatives", Acs Photonics, (Jul. 3, 2014), pp. 703-709 , vol. 1, [online], [retrieved on Oct. 23, 2020], Retrieved from the Internet < https://doi.org/10.1021/ph500118y>.

Anopchenko, A., Gurung, S., Tao, L., Armdt, C., Lee, H. W., "Atomic Layer Deposition of Ultra-thin and smooth Al-doped ZnO for Zero-Index Photonics", Materials Research Express, (Jan. 24, 2018), 7 pages, vol. 5, No. 014012.

Herzing, A. A., Guler, U., Zhou, X. L., Boltasseva, A., Shalaev, V., Norris, T. B., "Electron energy loss spectroscopy of plasmon resonances in titanium nitride thin films", Applied Physics Letters, (Apr. 29, 2016), 5 pages, vol. 108, No. 171107.

Guler, U., Shalaev, V. M., Boltasseva, A., "Nanoparticle plasmonics: going practical with transition metal nitrides", Materials Today, (May 2015), pp. 227-237, vol. 18, No. 4.

Gui, L., Bagheri, S., Strohfeldt, N., Hentschel, M., Zgrabik, C. M., Metzger, B., Linnenbank, H., Hu, E. L., Giessen, H., "Nonlinear Refractory Plasmonics with Titanium Nitride Nanoantennas", Nano Letters, (Aug. 5, 2016), pp. 5708-5713, vol. 16, [online], [retrieved on Oct. 26, 2020], Retrieved from the Internet < https://doi.org/10.1021/acs.nanolett.6b02376>.

Lalisse, A., Tessier, G., Plain, J., Baffou, G., "Plasmonic efficiencies of nanoparticles made of metal nitrides (TiN, ZrN) compared with gold", Scientific Reports, (Dec. 9, 2016), pp. 38647-38647, vol. 6.

He, W. Y., Ai, K. L., Jiang, C. H., Li, Y. Y., Song, X. F., Lu, L. H., "Plasmonic titanium nitride nanoparticles for in vivo photoacoustic tomography imaging and photothermal cancer therapy", Biomaterials, (Apr. 7, 2017), pp. 37-47, vol. 132.

Li, W., Guler, U., Kinsey, N., Naik, G. V., Boltasseva, A., Guan, J., Shalaev, V. M., Kildishev, A. V., "Reftactory plasmonics with titanium nitride: broadband metamaterial absorber", Advanced Materials, (2014), pp. 7959-7965, vol. 26.

Silveirinha, M., Engheta, N., "Tunneling of electromagnetic energy through subwavelength channels and bends using epsilon-near-zero materials", Physical Review Letter, (2006), 4 pages, vol. 97, No. 157403.

Davoyan, A. R., Mahmoud, A. M., Engheta, N., "Optical isolation with epsilon-near-zero metamaterials", Optical Express, (Feb. 1, 2013), pp. 3279-3286 vol. 21, No. 3.

Alam, M. Z., De Leon, I., Boyd, R. W., "Large optical nonlinearity of indium tin oxide in its epsilon-near-zero region", Science, (May 13, 2016), pp. 795-797, vol. 52, Issue 6287,[online], [retrieved on Oct. 26, 2020], Retrieved from the Internet <10.1126/science.aae0330>.

Yoon, J., Zhou, M., Badsha, M. A., Kim, T. Y., Jun, Y. C., Hwangbo, C. K., "Broadband Epsilon-Near-Zero Perfect Absorption in the Near-Infrared", Scientific Reports, (Aug. 4, 2015), 8 pages, vol. 5.

Luk, T. S., Campione, S., Kim, I., Feng, S. M. Feng, Jun, Y. C., Liu, S., Wright, J. B., Brener, I., Catrysse, P. B., Fan, S. H., Sinclair, M. B., "Directional perfect absorption using deep subwavelength low-permittivity films", Physical Review, (2014), 10 pages, vol. B, No. 90, 085411.

Kim, T. Y., Badsha, M. A., Yoon, J., Lee, S. Y., Jun, Y. C., Hwangbo, C. K., "General Strategy for Broadband Coherent Perfect Absorption and Multi-wavelength All-optical Switching Based on Epsilon-Near-Zero Multilayer Film", Scientific Reports, (Mar. 11, 2016), 11 pages, vol. 6, No. 22941.

Campione, S., Brener, I., Marquier, F., "Theory of epsilon-near-zero modes in ultrathin films", Physical Review, (Mar. 16, 2015), 5 pages, vol. B, No. 91.

Feng, S., Halterman, K., "Coherent perfect absorption in epsilon-near-zero metamaterials", Physical Review, (2012), Issue B, No. 86.

Silveirinha, M. G., Alu, A., Edwards, B., Engheta, N., "Overview of Theory and Applications of Epsilon-Near-Zero Materials", http://www.ursi.org/proceedings/procGA08/papers/B01p6.pdf, 4 pages.

Alu, A., Silveirinha, M.G., Salandrino, A., Engheta, N., "Epsilon-Near-Zero (ENZ) Metamaterials and Electromagnetic Sources: Tailoring the Radiation Phase Pattern", https://pdfs.semanticscholar.org/c507/a683ec3be8015bd1eba17c62acaee1f709b3.pdf, Apr. 15, 2007, 15 pages, vol. 75, Issue 15, Article 155410.

Davoyan, A. R., Mahmoud, A. M., Engheta, N., "Optical isolation with epsilon-near-zero metamaterials", https://www.osapublishing.org/DirectPDFAccess/9DBC5CBF-CB37-4A13-AC7574B02203EBEF_248908/oe-21-3-3279.pdf?da=1&id=248908&seq=0&mobile=no, Jan. 19, 2013, pp. 3279-3286, vol. 21, No. 3, Optics Express, Philadelphia, USA.

Kats, M.A., Blanchard, R., Ramanathan, S., Capasso, F., "Thin-Film Interference in Lossy, Ultra-Thin Layers", https://www.seas.harvard.edu/capasso/wp-content/uploads/publications/40-47-thinfilm-jan-5.pdf, Jan. 2014, pp. 40-47, Optics & Photonics News.

Babicheva, V., Boltasseva, A., Lavrinenko, A., "Transparent conducting oxides for electro-optical plasmonic modulators", http://orbit.dtu.dk/files/115238305/Lavrinenko_Nanophotonics.pdf, 2015, pp. 165-185.

"Metamaterials Market Size, Analysis, Trends, Report, Share, Investment Opportunities and Forecast to 2022", http://www.abnewswire.com/pressreleases/metamaterials-market-size-analysis-trends-report-share-investment-opportunities-and-forecast-to-2022_100535.html, Feb. 21, 2017, 3 pages.

"Telecommunication to be the first commercial application segment for Metamaterials", https://www.marketsandmarkets.com/ResearchInsight/metamaterials.asp, 2 pages, Markets and Markets Research Private Ltd.

"Optical Coating Market by Technology, (IAD, E-Beam Evaporation, Sputtering Process and Vacuum Deposition), by Type, End-Use Industry & by Region—Trends and Forecasts to 2020", http://www.marketsandmarkets.com/Market-Reports/optical-coating-market-128999548.html, Feb. 2016, 13 pages.

Koch, U., Hoessbacher C.,Niegemann, J., Hafner, C., Leuthold, J., "Digital Plasmonic Absorption Modulator Exploiting Epsilon-Near-Zero in Transparent Conducting Oxides", IEEE Photonics Society, Feb. 2016, 14 pages, vol. 8, No. 1.

Luk, T.S., Campione, S., Kim, I., Feng, S., Jun, Y. C., Liu, S., Wright, J.B., Catrysse, P. B., Fan, Shanhui, Sinclair, M.B., "Directional perfect adsorption using deep subwavelength low permittivity films", Physical Review B, Aug. 11, 2014, 14 pages, vol. 90, Issue 8, American Physical Society.

Vassant, S., Hugonin, J., Marquier, F., Greffet, J., "Berreman mode and epsilon near zero mode", Optics Express, Oct. 8, 2012, pp. 23971-23977, vol. 20, No. 21.

(56) References Cited

OTHER PUBLICATIONS

Foley IV, J., Harutyunyan, H., Rosenmann, D., Divan, R., Wiederrecht, G.P., Gray, S.K., "When are Surface Plasmon Polaritons Excited in the Kretschmann-Raether Configuration?", Scientific Reports, Apr. 15, 2015, 5 pages, vol. 5:9929.

Shi, K., Lu, Z., "Filed-effect optical modulation based on epsilon-near-zero conductive oxide", Optics Communications 370, 2016, pp. 22-28.

Kim, T.Y., Badsha, MD. A., Yoon, J., Lee, S.Y., Jun, Y.C., Hwangbo, C.K., "General Strategy for Broadband Coherent Perfect Absorption and Multi-wavelength All-optical Switching Based on Epsilon-Near-Zero Multilayer Films", Scientific Reports, Mar. 11, 2016, 11 pages, vol. 6:22941.

Ma, Z., Li, Z., Liu, K., Ye, C., Sorger, V.J., "Indium-Tin-Oxide for High-performance Electro-optic Modulation", Nanophotonics, 2015, pp. 198-213, vol. 4.

Papadakis, G.T., Atwater, H.A., "Field effect-induced tunability in planner hyperbolic metamaterials", PhysRevB.92.184101, Chapter II.A. Electronic properties: High strength dielectrics and TCOs, Jul. 23, 2015, 20 pages.

Anopchenko, A., Tao, L., Arndt, C., Lee, H.W.H., "Field-Effect Tunable and Broadband Epsilon-Near-Zero Perfect Absorbers with Deep Subwavelength Thickness", ACS Photonics, 2018, pp. 2631-2637, vol. 5.

Naik, G. V., Liu, J., Kildishev, A.V., Shalaev, V.M., Boltasseva, A., "Demonstration of Al:ZnO as a plasmonic component for near-infrared metamaterials", Proceedings of the National Academy of Sciences (PNAS), May 18, 2012, pp. 8834-8838, vol. 109, No. 23.

Ribarov, J., International Search Report for International Patent Application No. PCT/US2018/032342, dated Sep. 17, 2018, European Patent Office.

Diot, P., Written Opinion for International Patent Application No. PCT/US2018/032342, dated Sep. 17, 2018, European Patent Office.

Moroz, A., International Search Report for International Patent Application No. PCT/US2019/037605, dated Sep. 4, 2019, European Patent Office.

Moroz, A., Written Opinion for International Patent Application No. PCT/US2019/037605, dated Sep. 4, 2019, European Patent Office.

Vaiano, P. et al., "Lab on Fiber Technology for biological sensing applications", Nov. 22, 2016, Laser & Photonics Reviews, vol. 10 Issue 6, pp. 922-961.

Principe, M. et al. "Meta-tips for lab-on-fiber optrodes", Sixth European-Workshop on Optical Fibre Sensors, Intl. Society for Optics and Photonics, May 30, 2016, vol. 9916, pp. 1-4.

\* cited by examiner

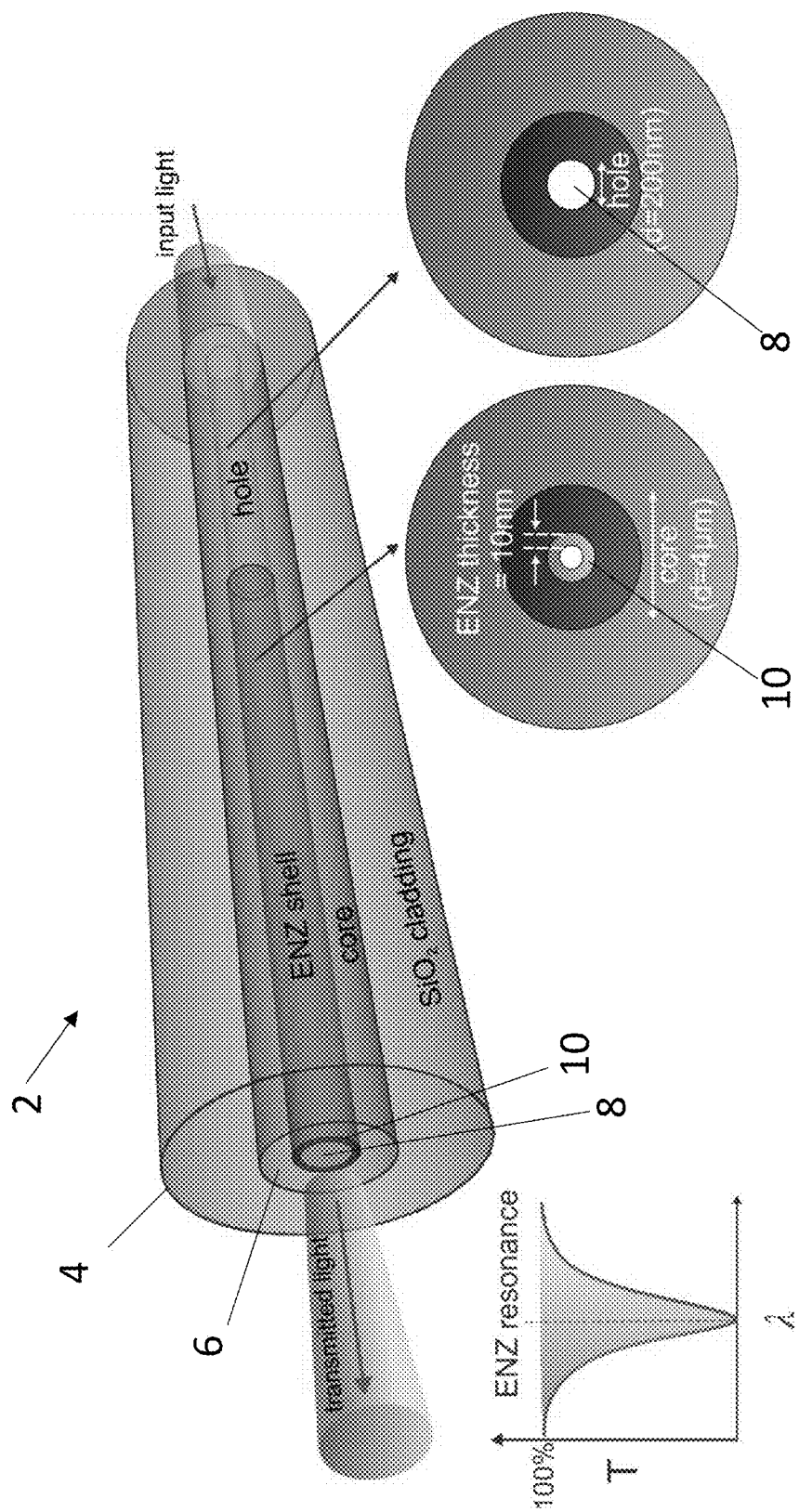

Fig. 4A
λ = 900 nm
(dielectric-like)
Fig. 4B
λ = 1080 nm
(at ENZ wavelength)
Fig. 4C
λ = 1300 nm
(metallic-like)
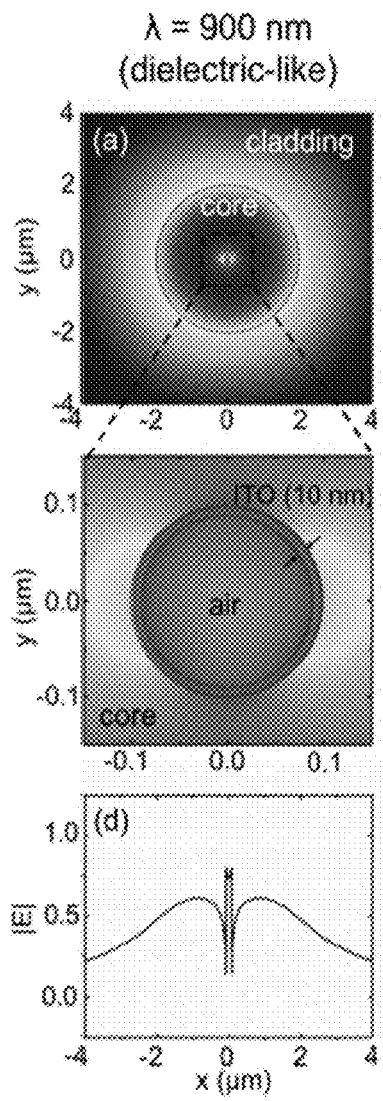
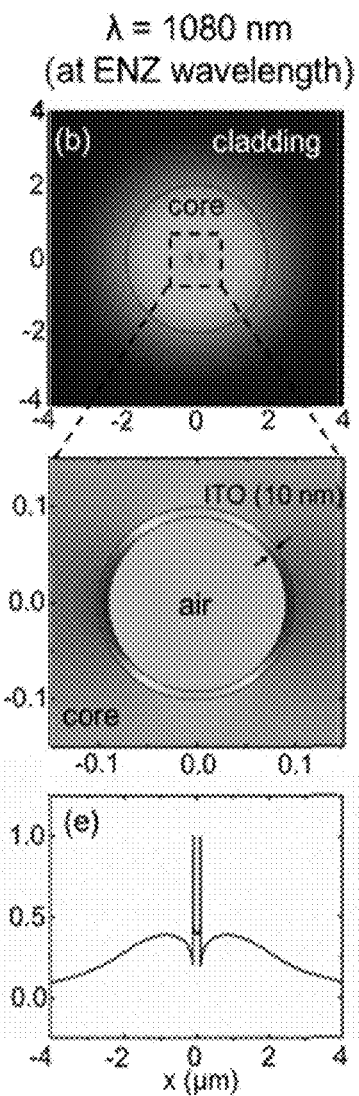
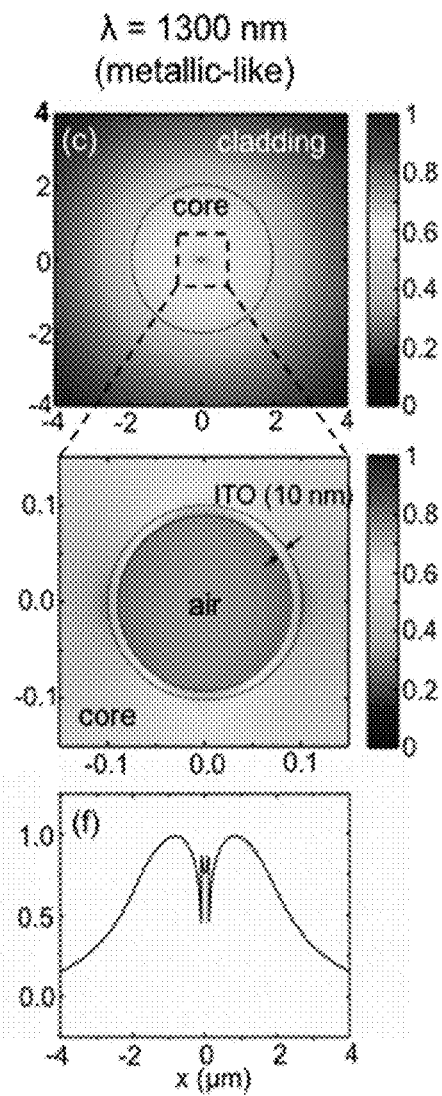
Fig. 4D
Fig. 4E
Fig. 4F

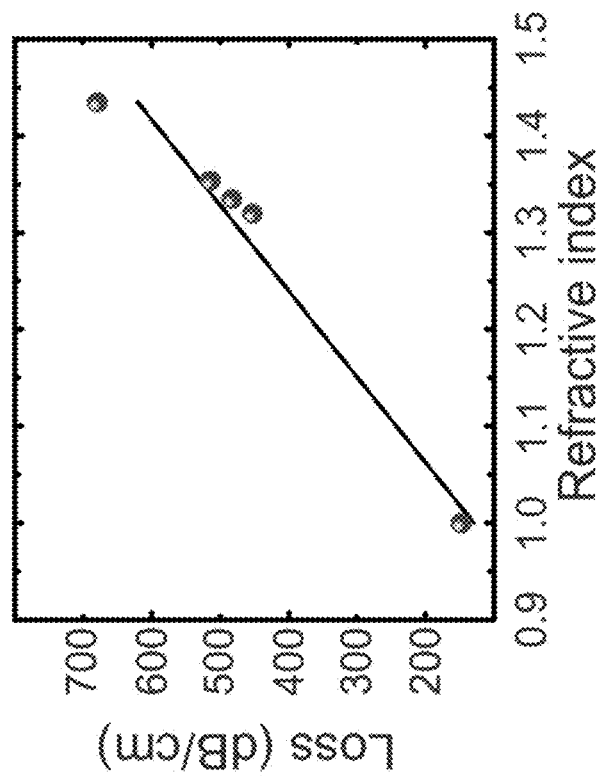
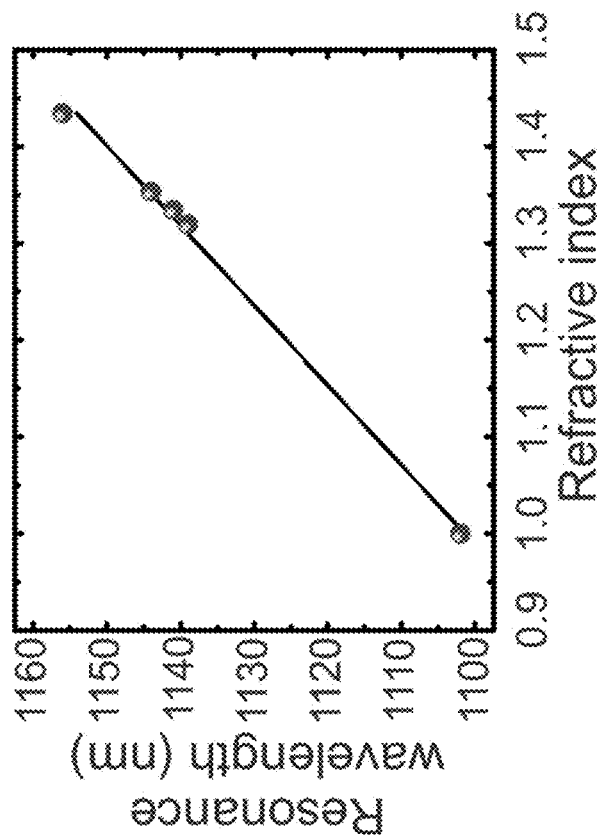
Fig. 7C
Fig. 7B

Fig. 8A
Fig. 8B
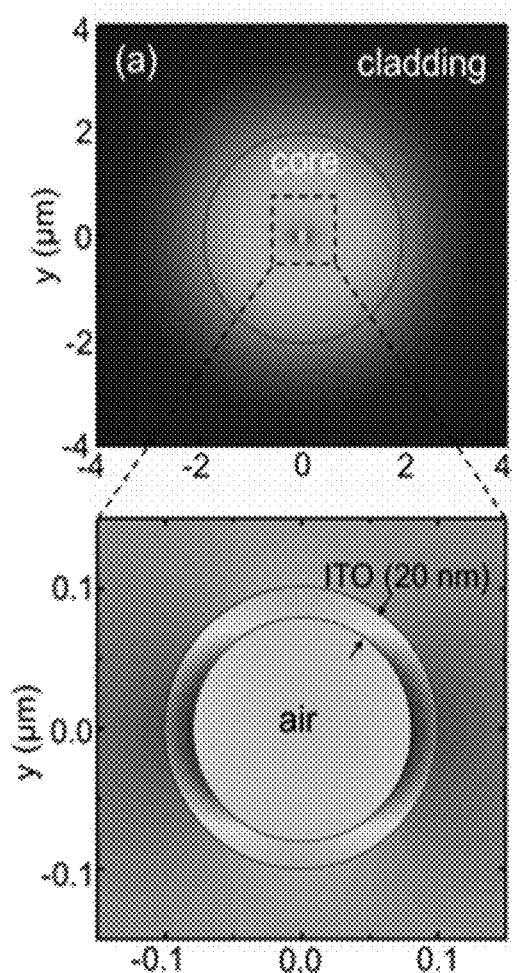
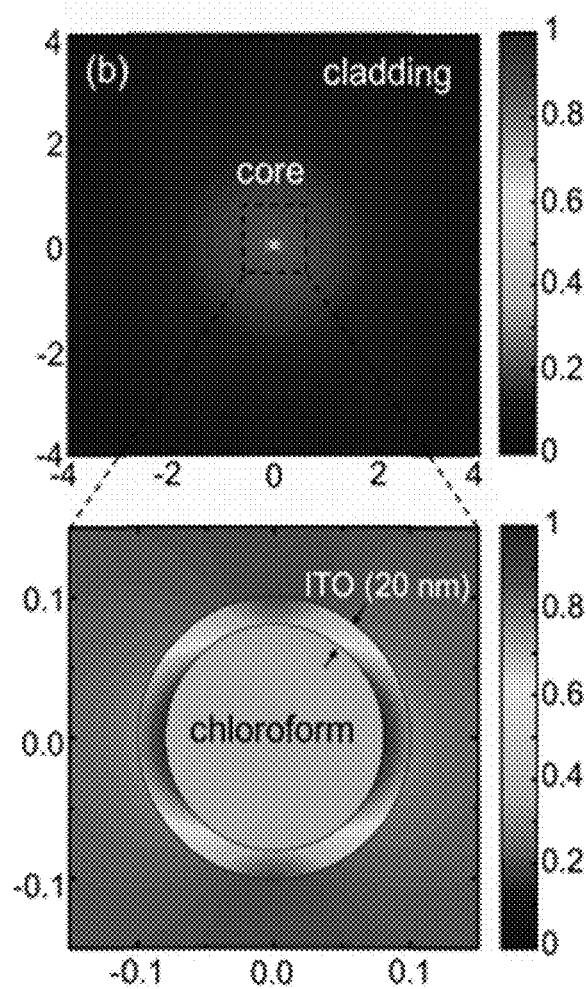
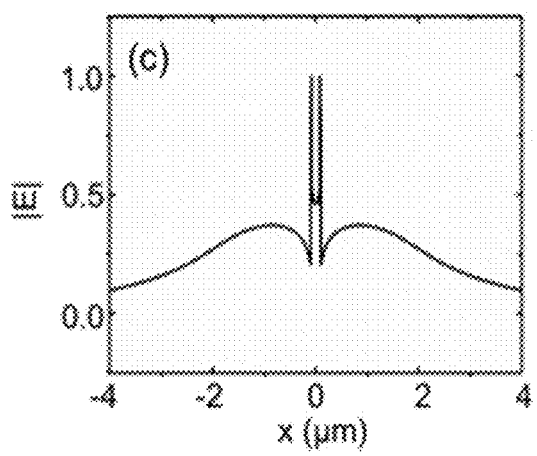
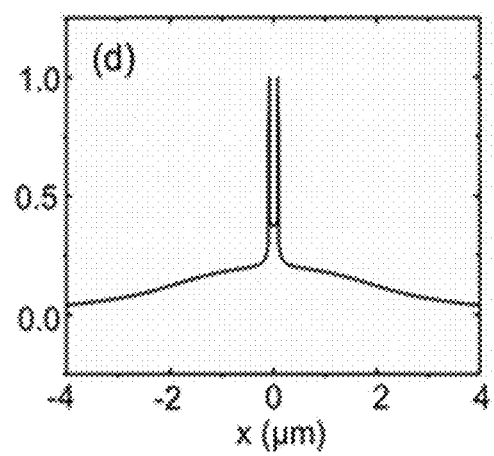
Fig. 8C
Fig. 8D

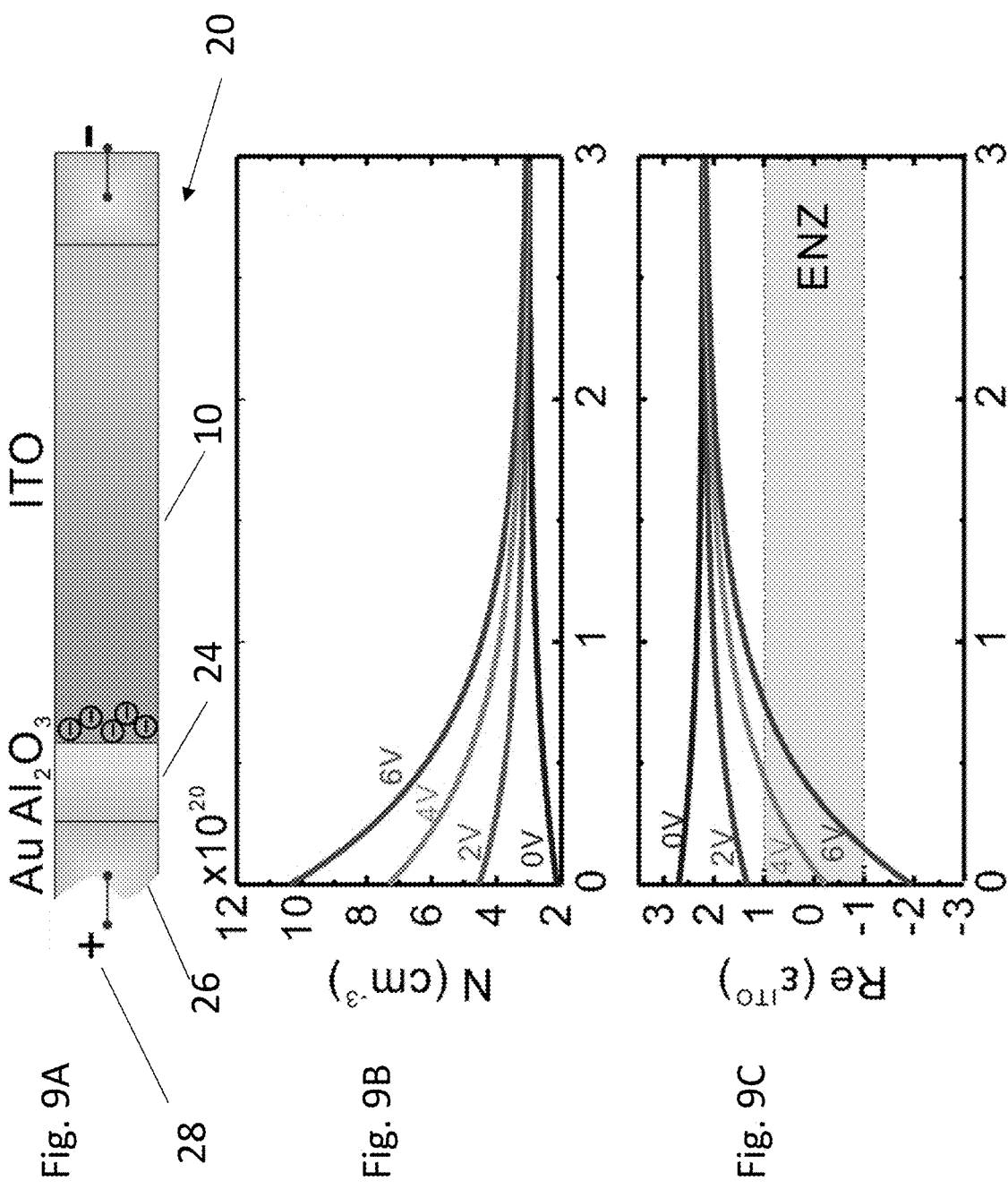

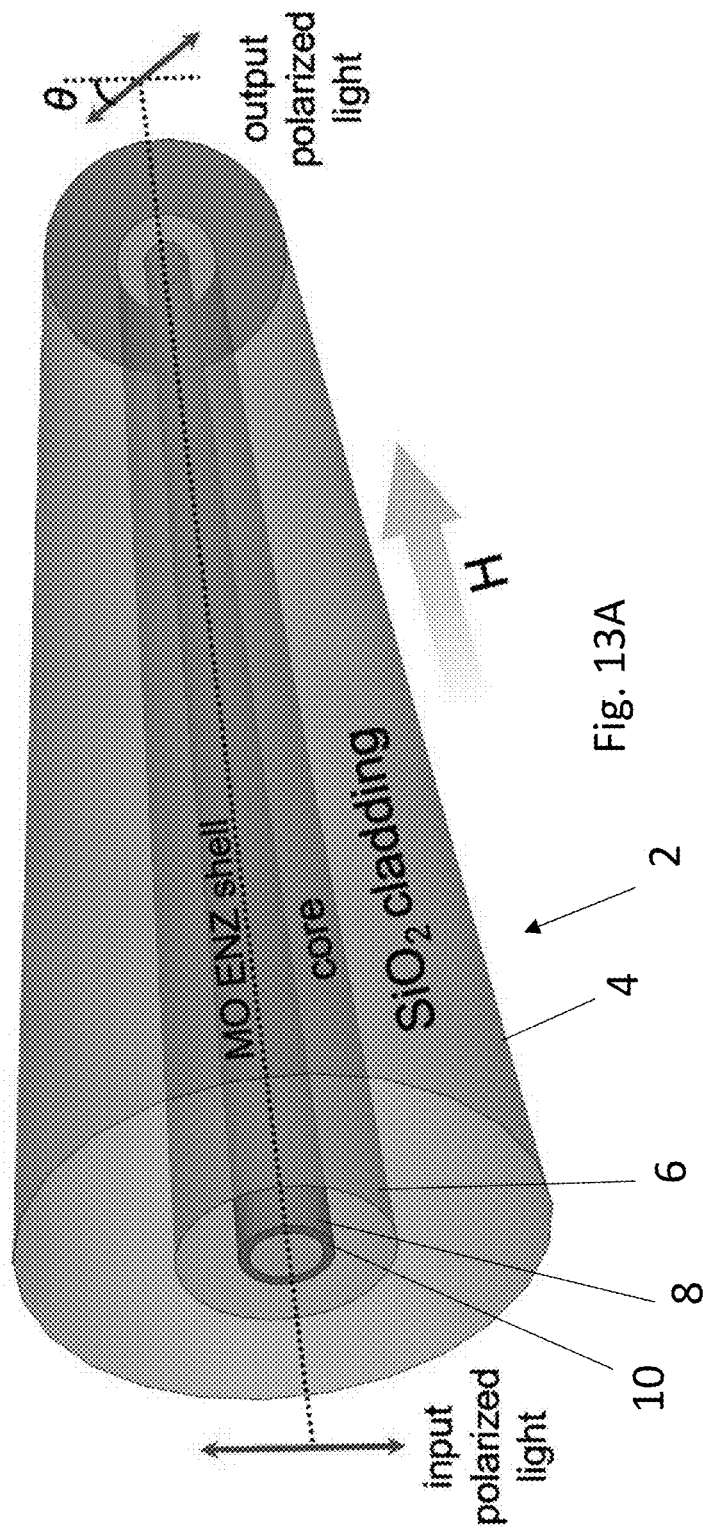
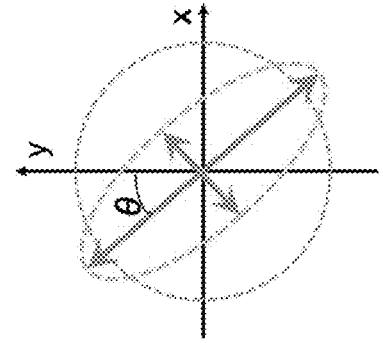
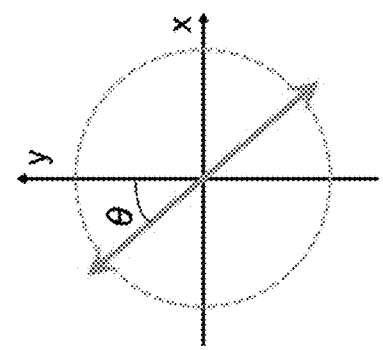
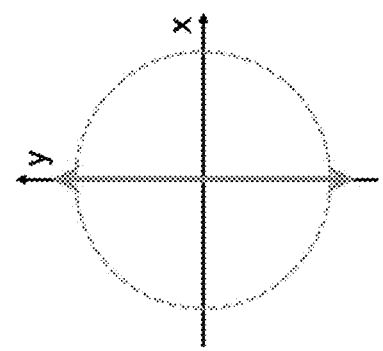
Fig. 13A
Fig. 13B

INTEGRATED OPTICAL FIBER AND EPSILON-NEAR-ZERO MATERIAL

CROSS REFERENCE TO RELATED APPLICATIONS

This application claims the benefit of U.S. Provisional Ser. No. 62/800,806, filed Feb. 4, 2019, entitled "Integrated Optical Fiber and Epsilon-Near-Zero Material", which is incorporated herein by reference.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

Field of the Invention

The disclosure generally relates to optical fiber. More specifically, the disclosure relates to optical fiber integrated with epsilon-near-zero capable materials that affects the performance characteristics of the optical fiber.

Description of the Related Art

Optical response of near-zero refractive index systems has been a topic of interest recently as the electromagnetic field inside the media with near-zero parameters, such as vanishing permittivity and permeability values, have been shown to exhibit unique optical properties. Those features may be exploited in various optical applications such as wavefront engineering, radiation pattern tailoring, non-reciprocal magneto-optical effects, nonlinear ultrafast optical switching, dielectric permittivity sensing, and broadband perfect absorption. Recent studies suggest that epsilon-near-zero (ENZ) properties can also be observed in a single highly doped conducting oxide thin film. Materials having ENZ properties include materials with low permittivity. Unique properties observed include enhanced absorption in transparent conducting oxide (TCO) ENZ layers, advanced resonant coupling properties with antenna, and strongly enhanced nonlinear response and light generation in a TCO slab. In addition, electrical tuning of conducting oxide materials to the ENZ regime results in efficient light manipulation and modulation. However, most of the studies on ENZ optical properties are limited to the excitation of ENZ mode in the planar structures or meta-surfaces with short interaction length, restricting the excitation platform.

Optical fiber is well-known example of a way to guide and manipulate light. It has been used extensively in various applications including long distance optical communication, light generation using fiber lasers, remote and optical sensing, fiber imaging in endoscopes, and fiber laser surgery. Although a dielectric optical waveguide is very efficient in transmitting light, its functionality is somewhat limited by the dielectric material of the core, which has poor electronic, magneto-optical, and nonlinear-optical responses and has the dielectric diffraction limit. Therefore, the optical properties of the optical fiber waveguide such as phase, amplitude, polarization state, and mode profile cannot be altered after the fiber drawing fabrication.

Therefore, there is a need to integrate new materials and nanostructures into fiber components for enhanced processing and transmission capabilities and novel functionalities.

BRIEF SUMMARY OF THE INVENTION

The present disclosure provides an optical waveguide design of a fiber modified with a thin layer of epsilon-near-zero (ENZ) material. The design results in an excitation of a highly confined waveguide mode in the fiber near the wavelength where permittivity of thin layer approaches zero. Due to the high field confinement within thin layer, the ENZ mode can be characterized by a peak in modal loss of the hybrid waveguide. Results show that such in-fiber excitation of ENZ mode is due to the coupling of the guided fundamental core mode to the thin-film ENZ mode. The phase matching wavelength, where the coupling takes place, varies depending on the refractive index of the constituents. These ENZ nanostructured optical fibers have many potential applications, for example, in ENZ nonlinear and magneto-optics, as in-fiber wavelength-dependent filters, and as subwavelength fluid channel for optical and bio-photonic sensing. Propagating fields can be confined inside a conducting oxide/metal nitride ENZ materials embedded in an optical fiber waveguide. Examples of optical fibers include a nanobore fiber, an anti-resonance hollow core optical fiber, and an optical fiber with D-shaped platform.

In general, the disclosure provides an optical fiber, an optical fiber coupled with a layer of transparent conducting oxide, a method of manufacturing an optical fiber, and a method of using an optical fiber, as disclosed and discussed herein.

The disclosure provides an optical fiber, comprising: a longitudinal core layer of dielectric material; a longitudinal cladding layer surrounding at least a portion of the core; and a longitudinal layer of ENZ material formed parallel to the core.

The disclosure also provides an optical fiber, comprising: a longitudinal hollow core; a longitudinal cladding layer surrounding at least a portion of the core; and a longitudinal layer of ENZ material formed parallel to the core.

The disclosure further provides a method of alternating light in an optical fiber, the optical fiber having a longitudinal core layer of dielectric material, a longitudinal cladding layer surrounding at least a portion of the core, and a longitudinal layer of ENZ material formed parallel to the core, the method comprising: providing light to the optical fiber; and absorbing at least a portion of the light along the core as a result of the ENZ layer.

BRIEF DESCRIPTION OF THE SEVERAL VIEWS OF THE DRAWINGS

The patent or application file contains at least one drawing executed in color. Copies of this patent or patent application publication with color drawing(s) will be provided by the Office upon request and payment of the necessary fee.

FIG. 1A is schematic of an example of an embodiment of an ENZ optical fiber waveguide design with two inserts of expanded cross sections of portions of a core with an ENZ coating and without an ENZ coating as indicated.

FIG. 1A' is a schematic graph of transmission of a light through the optical fiber of FIG. 1A, based on wavelength.

FIG. 1B' is a schematic graph of absorption of a light through the model of FIG. 1B, based on wavelength.

FIG. 4A is a schematic electric field profile of the fundamental mode supported by the ENZ optical fiber at a 900 nm outside ENZ wavelength, the profile being across the entire fiber cross section in the top image with a zoomed schematic view of the core below the top image.

FIG. 4B is a schematic electric field profile of the fundamental mode supported by the ENZ optical fiber at a 1080 nm outside ENZ wavelength, the profile being across the entire fiber cross section in the top image with a zoomed schematic view of the core below the top image.

FIG. 4C is a schematic electric field profile of the fundamental mode supported by the ENZ optical fiber at a 1300 nm outside ENZ wavelength, the profile being across the entire fiber cross section in the top image with a zoomed schematic view of the core below the top image.

FIG. 4D is a schematic graph of the electric field along the diameter of the fiber in FIG. 4A at the 900 nm outside ENZ wavelength.

FIG. 4E is a schematic graph of the electric field along the diameter of the fiber in FIG. 4B at the 1000 nm outside ENZ wavelength.

FIG. 4F is a schematic graph of the electric field along the diameter of the fiber in FIG. 4C at the 1300 nm outside ENZ wavelength.

FIG. 7B is a schematic graph of a refractive index dependence of ENZ resonance wavelength.

FIG. 7C is a schematic graph of a refractive index dependence of loss.

FIG. 8A is a schematic electric field profile at ENZ resonance for air as an analyte placed inside the core of an ENZ optical fiber with an ITO shell in the core, the profile being across the entire fiber cross section in the top image with an expanded schematic view of the core below the top image.

FIG. 8B is a schematic electric field profile at ENZ resonance for chloroform as an analyte placed inside the core of an ENZ optical fiber with an ITO shell in the core, the profile being across the entire fiber cross section in the top image with an expanded schematic view of the core below the top image.

FIG. 8C is a schematic graph of the electric field along the diameter of the fiber in FIG. 8A.

FIG. 8D is a schematic graph of the electric field along the diameter of the fiber in FIG. 8B.

FIG. 9A is a schematic diagram of an example of a conducting oxide field-effect structure used in light manipulation.

FIG. 9B is a schematic graph of a spatial distribution of the carrier concentration N for different applied voltages using the structure of FIG. 9A.

FIG. 9C is a schematic graph of a corresponding real part of the dielectric permittivity of ITO at wavelength of 1550 nm.

FIG. 13A is a schematic diagram of another embodiment of an ENZ fiber having an ENZ coating with magneto-optical properties.

FIG. 13B is a schematic diagram of polarized input light being reoriented by magnetic field through the ENZ coating in the ENZ fiber of FIG. 13A.

DETAILED DESCRIPTION

Figure 1B:
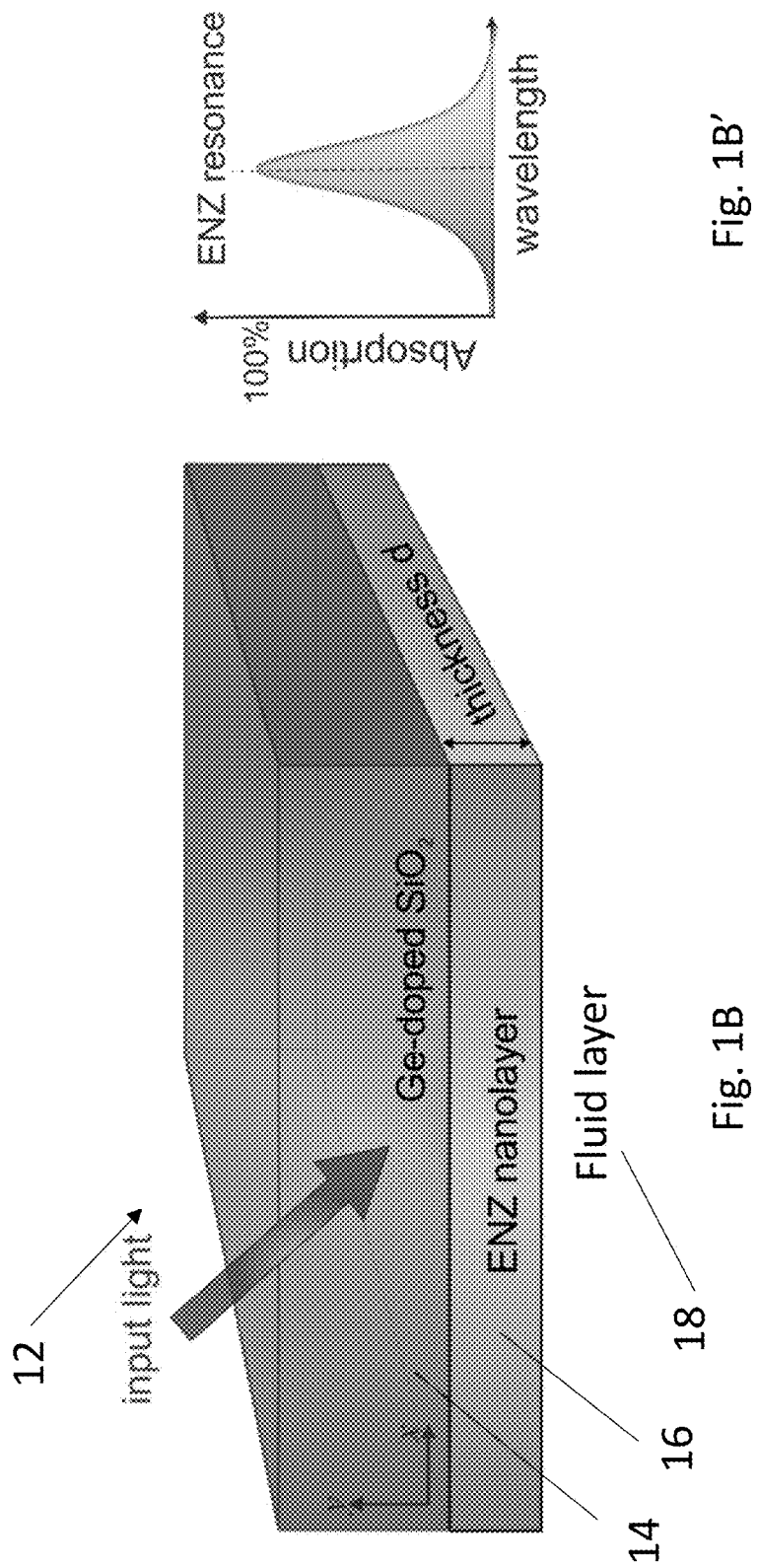
FIG. 1B is a schematic model of an example of an ENZ coating on a doped core surface for excitation of an ENZ thin film mode.

The Figures described above and the written description of specific structures and functions below are not presented to limit the scope of what Applicant has invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present disclosure will require numerous implementation-specific decisions to achieve the developer's ultimate goal for the commercial embodiment. Such implementation-specific decisions may include, and likely are not limited to, compliance with system-related, business-related, government-related, and other constraints, which may vary by specific implementation or location, or with time. While a developer's efforts might be complex and time-consuming in an absolute sense, such efforts would be, nevertheless, a routine undertaking for those of ordinary skill in this art having benefit of this disclosure. It must be understood that the inventions disclosed and taught herein are susceptible to numerous and various modifications and alternative forms. The use of a singular term, such as, but not limited to, "a," is not intended as limiting of the number of items. Further, the various methods and embodiments of the system can be included in combination with each other to produce variations of the disclosed methods and embodiments. Discussion of singular elements can include plural elements and vice-versa. References to at least one item may include one or more items. Also, various aspects of the embodiments could be used in conjunction with each other to accomplish the understood goals of the disclosure. Unless the context requires otherwise, the term "comprise" or variations such as "comprises" or "comprising," should be understood to imply the inclusion of at least the stated element or step or group of elements or steps or equivalents thereof, and not the exclusion of a greater numerical quantity or any other element or step or group of elements or steps or equivalents thereof. The device or system may be used in a number of directions and orientations. The order of steps can occur in a variety of sequences unless otherwise specifically limited. The various steps described herein can be combined with other steps, interlineated with the stated steps, and/or split into multiple steps. Some elements are nominated by a device name for simplicity and would be understood to include a system or a section, such as a processor would encompass a processing system of related components that are known to those with ordinary skill in the art and may not be specifically described.

The present disclosure provides an optical waveguide design of a fiber modified with a thin layer of epsilon-near-zero (ENZ) material. The design results in an excitation of a highly confined waveguide mode in the fiber near the wavelength where permittivity of thin layer approaches zero. Due to the high field confinement within thin layer, the ENZ mode can be characterized by a peak in modal loss of the hybrid waveguide. Results show that such in-fiber excitation of ENZ mode is due to the coupling of the guided fundamental core mode to the thin-film ENZ mode. The phase matching wavelength, where the coupling takes place, varies depending on the refractive index of the constituents. These ENZ nanostructured optical fibers have many potential applications, for example, in ENZ nonlinear and magneto-optics, as in-fiber wavelength-dependent filters, and as subwavelength fluid channel for optical and bio-photonic sensing. Propagating fields can be confined inside a conducting oxide/metal nitride ENZ materials embedded in an optical fiber waveguide. Examples of optical fibers include a nanobore fiber, an anti-resonance hollow core optical fiber, and an optical fiber with D-shaped platform.

Photonic crystal fiber (PCF) or micro-structured optical fiber includes hollow channels running along the entire length of a glass strand, providing unique platform with long interaction length and engineerable dispersion for the studies of nonlinear optics, optical communication, optical/bio sensing, and so forth. The optical properties of PCFs can be changed by filling the hollow channels with materials such as semiconductors and metals to excite the Mie resonances and surface plasmon resonances. Those metal/semiconductor infiltrated fibers have been proposed to use for optical sensing and in-fiber device applications. Simplified version of photonic crystal fiber with enhanced light-matter interaction could be achieved by introducing a nanoscale hollow channel into conventional optical fiber (e.g., nanobore optical fiber). Such nanobore fiber further allows the light coupling to the plasmonic modes of gold nanowire for polarization conversion and optical detection of virus in nano-fluid channel.

The disclosure provides information to show the ENZ mode excitation in optical fiber platform and demonstrate that propagating fields can be confined inside a region coated with ENZ conducting oxide material that is incorporated into a nanostructured optical fiber waveguide. The novel hybrid optical fibers could be used as a platform for highly sensitive optical sensing and magneto/nonlinear-ENZ optical studies.

FIG. 1A is schematic of an example of an embodiment of an ENZ optical fiber waveguide design with two inserts of expanded cross sections of portions of a core with an ENZ coating and without an ENZ coating as indicated. The right insert (labelled Section (I)) of the structure is the hollow nanobore fiber. The left insert (labelled Section (II)) depicts the ENZ fiber where the inner surface of the central hollow channel is coated with layer of transparent conducting oxide (TCO) such as indium tin oxide (ITO). One example of an ENZ fiber 2 waveguide design is a modified version of nanobore fiber that includes three concentric cylindrical layers shown in FIG. 1A. The two outermost longitudinal layers act as cladding 4 and core 6, respectively. In this embodiment, the core contains a longitudinal nano-sized hollow channel 8 (also referenced herein as a "nanobore"), generally centrally located in the core. The cladding 4 can be for example a silica cladding, the core 6 can be for example a GeO2 wt. 9% doped silica core of 4 µm diameter, and the hollow channel 8 can be for example 200 nm in diameter. The sizes, thicknesses, and shapes can vary and are only an example for illustration. The innermost thin layer 10 is longitudinally formed from a film is made of ENZ material parallel to the core that in this embodiment surrounds the hollow channel 8 at least a portion of the length of the hollow channel. The subwavelength thickness of the ENZ layer ensures that the guided core fiber mode can be coupled to the thin film ENZ mode whose domain of existence is limited to film thickness much less than the plasma wavelength of the material at which its permittivity vanishes.

FIG. 1A' is a schematic graph of transmission of a light through the optical fiber of FIG. 1A, based on wavelength. The ability to confine electromagnetic energy in a small space at the medium's ENZ wavelength motivates a search for highly confined propagating polariton modes using ENZ materials. Three-layer structures, where a sub-wavelength thin layer of indium tin oxide (ITO) is sandwiched between two dielectric layers, can support ENZ polariton modes. The disclosure shows the existence of a propagating mode in an optical fiber with a nano-hollow channel modified with an ENZ layer within which an enhanced field is excited.

Other TCO material, such as aluminum zinc oxide (AZO) and others, can be used for forming the thin film of the ENZ material. In some embodiments, other ENZ material, such as transition metal nitrides (TMNs) (e.g. titanium nitride (TiN) and zirconium nitride (ZrN)), can be used in addition to or in lieu of a TCO. In some nonlimiting examples of experiments disclosed and described herein, ITO, a CMOS compatible TCO material, is used as the ENZ medium in the analysis. The real part of ITO permittivity crosses zero at the bulk plasmon resonant wavelength, which can be tuned in near-infrared by controlling the carrier concentration of the material. The frequency dependent complex permittivity of ITO was calculated using the Drude model. For the designed ITO carrier concentration of 1021, the real part of permittivity function of the ITO crosses zero at 1068 nm and with small imaginary part of permittivity (Im($\varepsilon$)=0.41). This carrier concentration of ITO could be achieved by various deposition techniques, for instance magneton sputtering and atomic layer deposition (ALD). ALD or wet chemistry techniques could be used to fabricate conducting oxide nano-layer inside the hollow channel of the fiber.

To understand the coupling mechanism between the guided mode in the nanobore fiber and the thin film ENZ mode, the effective index of the guided fundamental core mode of the nanobore fiber as a function of excitation wavelength was modelled using finite difference numerical waveguide analysis method (see Methods). The effective index of non-radiating thin film ENZ mode supported by the glass-ITO-air three-layer structure was modelled using the transfer matrix method (see Methods). The coupling between the fundamental mode of the nanobore fiber and thin film ENZ mode occurs at the phase matching wavelength, at which point the effective index functions of the two modes intersect and their momenta are equal. The results show that at the phase matching wavelength, the field confinement inside the ITO layer in the ENZ fiber is the highest and the mode has the highest loss, thus confirming the excitation of thin film ENZ mode in the fiber structure.

FIG. 1B is a schematic model of an example of an ENZ coating on a doped core surface for excitation of an NR-ENZ thin film mode. FIG. 1B' is a schematic graph of absorption of a light through the model of FIG. 1B, based on wavelength. FIG. 1B shows an example of a glass-ITO-fluid three-layer structure 12 that is considered in calculating the thin film ENZ mode. The structure is comprised of a glass layer 14 corresponding to the core 6 in FIG. 1A, a thin ENZ layer 16 of, for example, ITO having the same thickness as the ENZ layer 10 inside the ENZ fiber 2 that is sandwiched between the glass layer 14 and a fluid layer 18 half spaces. In some embodiments, the fluid layer can be of air and in other embodiments, the fluid layer can be of other fluids such as the examples described below of ethanol and acetonitrile, and others that have different effects on the ENZ mode of the structure.

Figures 2A, 2B, 2C, 2D:
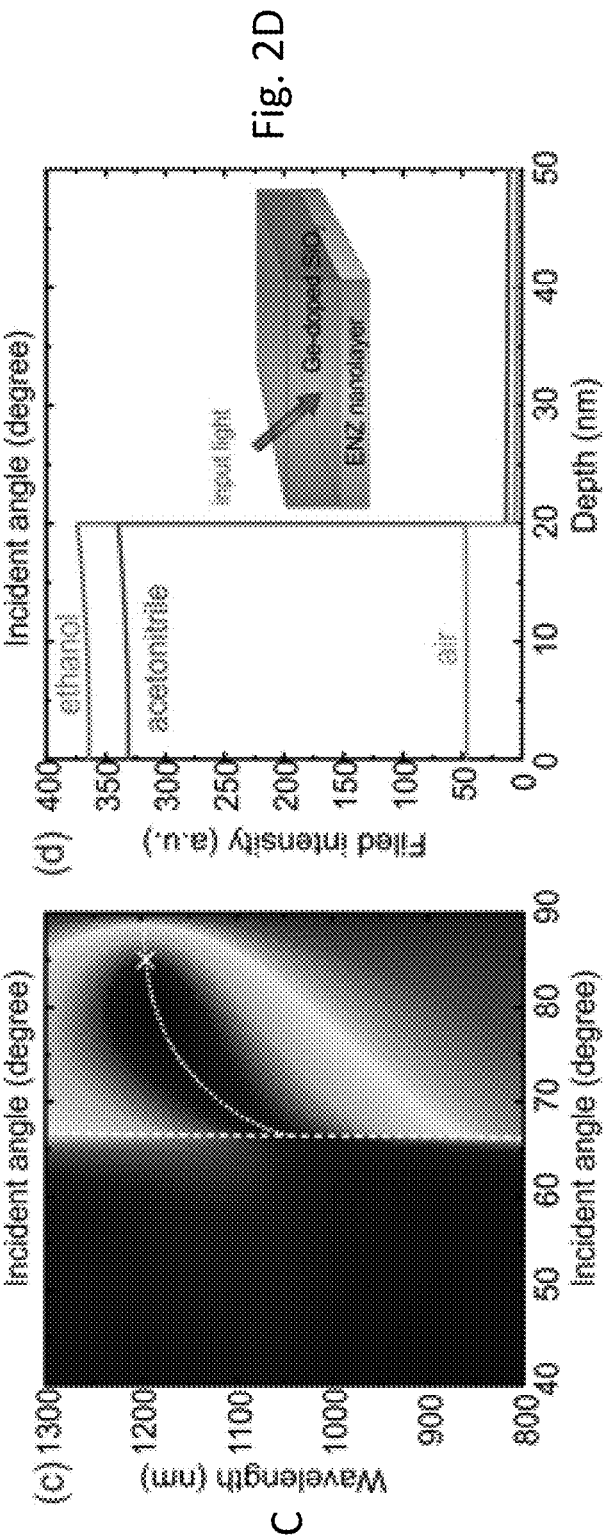
FIG. 2A is a schematic contour plot of reflectance as a function of wavelength and incident angle for a glass-ITO-ethanol as an example of a thin-film ENZ mode of a three-layer structure shown in the insert of FIG. 2D (as a model of the Section (II) of FIG. 1A).
FIG. 2B is a schematic contour plot of reflectance as a function of wavelength and incident angle for a glass-ITO-air as an example of a thin-film ENZ mode of a three-layer structure.
FIG. 2C is a schematic contour plot of reflectance as a function of wavelength and incident angle for a glass-ITO-acetonitrile as an example of a thin-film ENZ mode of a three-layer structure.
FIG. 2D is a schematic graph of field intensity (|E|) as a function of depth inside the ITO layer for the examples of structures in FIGS. 2A-2C.

FIG. 2A is a schematic contour plot of reflectance as a function of wavelength and incident angle for a glass-ITO-ethanol as an example of a thin-film ENZ mode of a three-layer structure shown in the insert of FIG. 2D as in FIG. 1B (as a model of the Section (II) of FIG. 1A). FIG. 2B is a schematic contour plot of reflectance as a function of wavelength and incident angle for a glass-ITO-air as an example of a thin-film ENZ mode of a three-layer structure. FIG. 2C is a schematic contour plot of reflectance as a function of wavelength and incident angle for a glass-ITO-acetonitrile as an example of a thin-film ENZ mode of a three-layer structure. FIG. 2D is a schematic graph of field intensity (|E|) as a function of depth inside the ITO layer for the examples of structures in FIGS. 2A-2C, where a zero depth corresponds to the glass-ITO interface. The vertical white dashed lines are the light lines/critical angles; the curved white dotted lines are the ENZ dispersion curves; and the white crosses on the white dotted lines are the phase-matching angles/wavelengths.

To obtain the dispersion curve of the thin film ENZ mode, we investigated the glass-ITO-air three layer geometry shown in FIG. 1B using the transfer matrix method. The dispersion of fundamental mode of the hollow nanobore fiber was obtained using finite difference numerical waveguide simulations on the cross-section of the nanobore fiber. To ensure the excitation of the non-radiative ENZ mode, the ENZ mode is excited from the glass half space using Kretschmann. The thickness of the ITO layer is 20 nm. The reflectance is calculated for varying incident angles and wavelengths for three exiting media: ethanol, air, and acetonitrile. Light incident from glass onto the ITO layer is perfectly absorbed at angles larger than the critical angle and at resonant wavelengths that corresponds to the ENZ mode. A frequency dependent real part of the effective index of the mode $n_{eff}$ was calculated ($n_{eff}=c\beta/\omega$, where $\beta$ is the propagation constant in the fiber for a given wavelength). Contour plots of the reflectance as a function of incident angle and excitation wavelength is presented in FIGS. 2A, 2B, and 2C, respectively for ethanol, air, and acetonitrile as exiting media. For small enough thickness of ITO layer (d<$\lambda$/50), light incident from glass onto ITO nanolayer is perfectly absorbed at large angles and at resonant wavelength which corresponds to the ENZ polariton mode. Thus for each incident angle, the wavelength that corresponds to minimum reflectance is traced to calculate the effective index of the thin film ENZ mode (see FIGS. 2A-2C). The electric field profile across the ITO layer and the three exiting medium at the phase matching wavelength and angle is also calculated using transfer matrix simulations and shown in FIG. 2D.

Figure 3:
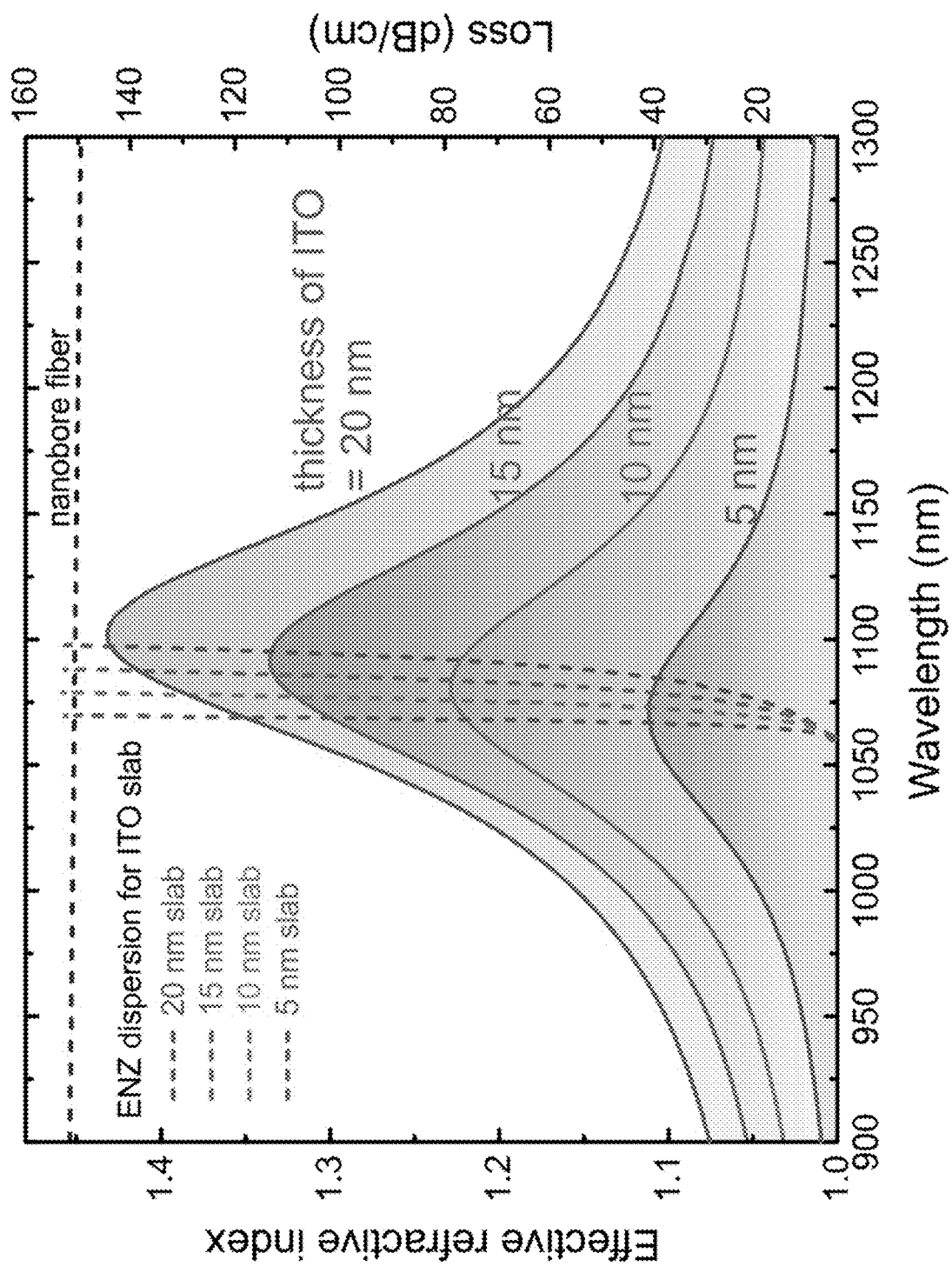
FIG. 3 is a schematic graph of phase matching conditions between fundamental waveguide modes in a hollow nano-bore fiber and thin-film ENZ modes of a glass-ITO-air three-layer geometry with ITO layer thicknesses of 5 nm, 10 nm, 15 nm, and 20 nm.

FIG. 3 is a schematic graph of phase matching conditions between fundamental waveguide modes in a hollow nanobore fiber and thin-film NR-ENZ modes of a glass-ITO-air three-layer geometry with examples of ITO layer thicknesses of 5 nm, 10 nm, 15 nm, and 20 nm. The dotted curves are effective refractive indices of waveguide and thin-film modes as a function of wavelength. The solid curves and color-shaded areas are modal loss spectra of the fundamental mode excited in the ENZ fiber for the four ITO shell thicknesses described above.

To understand the phase matching condition, the effective index of the thin film ENZ modes for four different ITO layer thicknesses and the fundamental mode of hollow nanobore fiber were calculated and depicted in FIG. 3. The thin film ENZ dispersion curves for the four thicknesses were calculated to show that the phase matching condition with fiber fundamental core modes depends on the thickness of the ITO layer. As the ITO thickness increases, the thin film ENZ dispersion curve shifts toward longer wavelengths and thus the phase matching wavelength (crossing wavelength) with the fiber fundamental core mode. The thin film dispersion curves intersect the fiber fundamental core mode dispersion at 1070 nm, 1079 nm, 1088 nm, and 1098 nm wavelengths for 5 nm, 10 nm, 15 nm, and 20 nm ITO layer thicknesses, respectively. Thus, in the ENZ fiber, the ENZ mode is expected to be excited at higher wavelengths for thicker ITO layers.

The excitation of ENZ modes in the fiber at the above resonant wavelengths was also verified. A finite difference method was used to solve the Maxwell's equations on a cross-section of the ENZ fiber waveguide. The resulted fundamental mode has highest spatial field distribution within the ITO layer compared to higher order modes. This ENZ mode was tracked over a wavelength range to calculate the modal loss:

$$\text{loss} = -20 \log_{10} e^{-2\pi k/\lambda_0},$$

where k is the imaginary part of the effective index).

The modal loss curves were calculated in the same way for four different ITO layer thicknesses: 5 nm, 10 nm, 15 nm, and 20 nm. FIG. 3 shows the modal losses of the fundamental mode of the ENZ fiber for four ITO layer thicknesses (color-shaded areas). Peak losses are observed at wavelengths 1071 nm, 1080 nm, 1092 nm, and 1102 nm for ITO layer thickness 5 nm, 10 nm, 15 nm, and 20 nm respectively. These resonances are in good agreement with the phase matching wavelengths of the nanobore fiber mode and the thin film ENZ modes calculated above. The peak in the loss spectra results from the excitation of ENZ thin film mode and the strong confinement/absorption by the ITO nano-layer.

The slight discrepancy between the phase matching and the peak loss wavelengths can be attributed to the mismatch between the excitation light sources: plane wave in the case of three layer geometry and core guided Eigen-mode source in the nanobore fiber. Another contributing factor is the curvature of the ITO layer inside the fiber that is cylindrical in contrast to the flat geometry of three-layer structure that is assumed when calculating the thin film ENZ modes. The resonance discrepancy is greater with increasing layer thickness due to the mismatch in the two geometries.

To study the nature of ENZ mode in the fiber, we plot the spatial electric field distributions of the fundamental mode supported by the ENZ fiber with 10 nm thick ITO layer at the ENZ wavelength and off-ENZ wavelength. FIG. 4A is a schematic electric field profile of the fundamental mode supported by the ENZ optical fiber at a 900 nm outside ENZ wavelength, the profile being across the entire fiber cross section in the top image with a zoomed schematic view of the core below the top image. The black circles outline the structure of the fiber. The figures shown are slightly elongated to fit the allowable margins and still show clarity. FIG. 4B is a schematic electric field profile of the fundamental mode supported by the ENZ optical fiber at a 1080 nm outside ENZ wavelength, the profile being across the entire fiber cross section in the top image with a zoomed schematic view of the core below the top image. FIG. 4C is a schematic electric field profile of the fundamental mode supported by the ENZ optical fiber at a 1300 nm outside ENZ wavelength, the profile being across the entire fiber cross section in the top image with a zoomed schematic view of the core below the top image. FIG. 4D is a schematic graph of the electric field along the diameter of the fiber in FIG. 4A at the 900 nm outside ENZ wavelength. FIG. 4E is a schematic graph of the electric field along the diameter of the fiber in FIG. 4B at the 1000 nm outside ENZ wavelength. FIG. 4F is a schematic graph of the electric field along the diameter of the fiber in FIG. 4C at the 1300 nm outside ENZ wavelength. At 1080 nm, which is the ENZ mode phase matching wavelength for 10 nm thick ITO layer, the magnitude of electric field is highly confined inside ITO layer (ENZ region) as shown in FIGS. 4B and 4E. The high field confinement in the ENZ nano-layer results in the highest modal loss at this wavelength as seen in FIGS. 2A-2C in the yellow solid curve.

Figure 5:
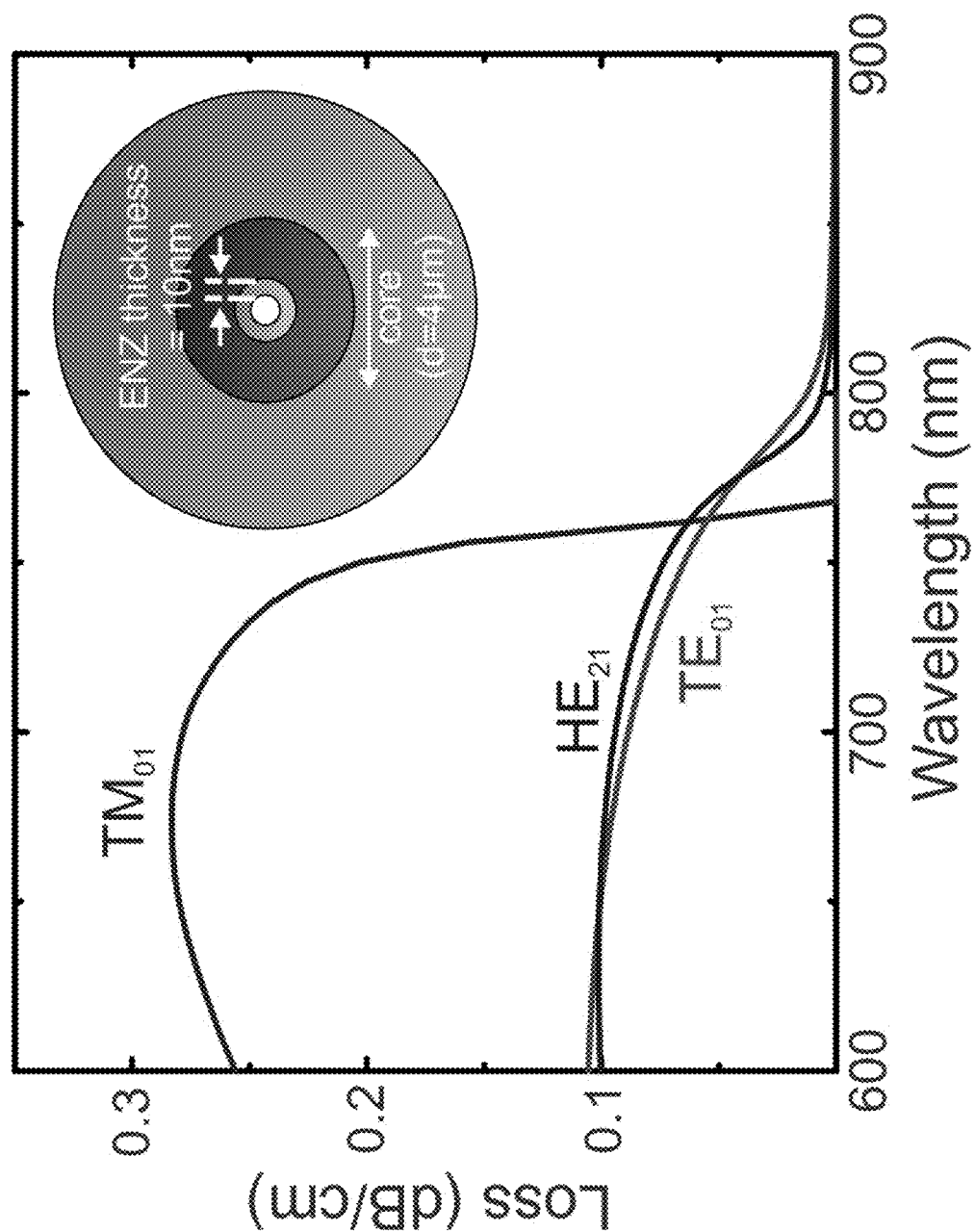
FIG. 5 is a schematic graph of modal losses of ENZ fiber higher order modes.

Referring briefly to FIG. 5, FIG. 5 is a schematic graph of modal losses of ENZ fiber higher order modes. Loss vanishes as the mode approaches cutoff wavelength. The graph shows the higher order modes $TM_{01}$, $TE_{01}$, and $HE_{21}$ cut off well below the ENZ regime of the ITO layer. Thus, only the fundamental mode $HE_{11}$ exhibits ENZ mode confinement. The field distribution does not exhibit radial symmetry, because the excitation fiber fundamental core mode is linearly polarized ($HE_{11}$). The radially polarized higher order mode\s ($TM_{01}$) is not supported by the nanobore fiber at the high wavelength regime.

Figure 6A:
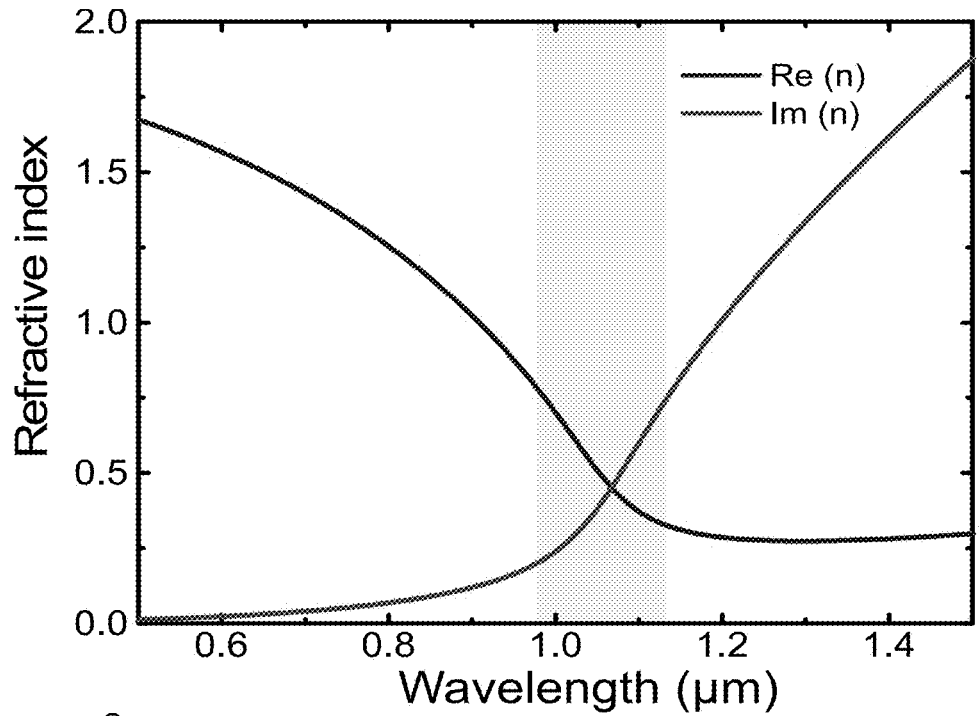
FIG. 6A is a schematic graph of a complex refractive index of ITO as a function of free space wavelength.
Figure 6B:
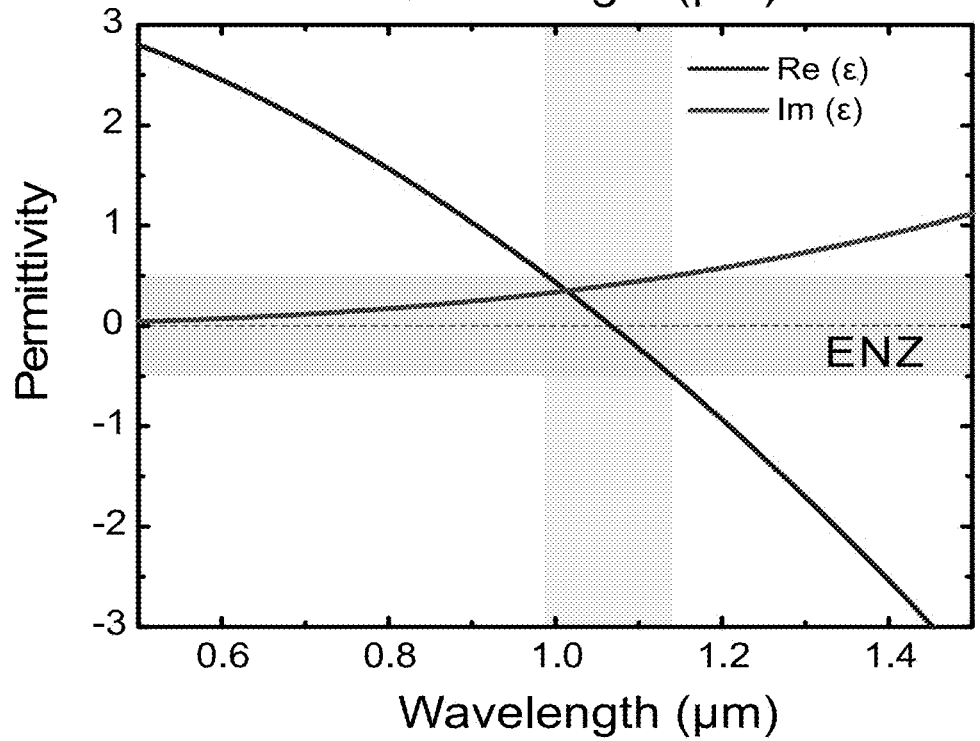
FIG. 6B is a schematic graph of permittivity of ITO as a function of free space wavelength. At the crossover of real and imaginary parts of the index, the real part of permittivity vanishes.

FIG. 6A is a schematic graph of a complex refractive index of ITO as a function of free space wavelength. At the crossover of real and imaginary parts of the index, the real part of permittivity vanishes. FIG. 6B is a schematic graph of permittivity of ITO as a function of free space wavelength. At the crossover of real and imaginary parts of the index, the real part of permittivity vanishes. At a shorter wavelength (900 nm), the refractive index of ITO resembles that of a dielectric with real part of value (n=1.022) falls between that of air at the center and doped silica core (n=1.459). In this regime, the field distribution resembles the profile of the fundamental mode of hollow nanobore fiber as can be observed in FIG. 4A and FIG. 4D. At longer wavelength (1300 nm), ITO is in essence metallic-like having negative real part of permittivity ($\varepsilon = -1.707 + 0.732i$) with real part of index (0.274) smaller than imaginary part (1.335). Thus, the field is mostly contained in the core and central air channel, decaying inside the ITO layer as depicted in FIGS. 4C and 4F.

Figure 7A:
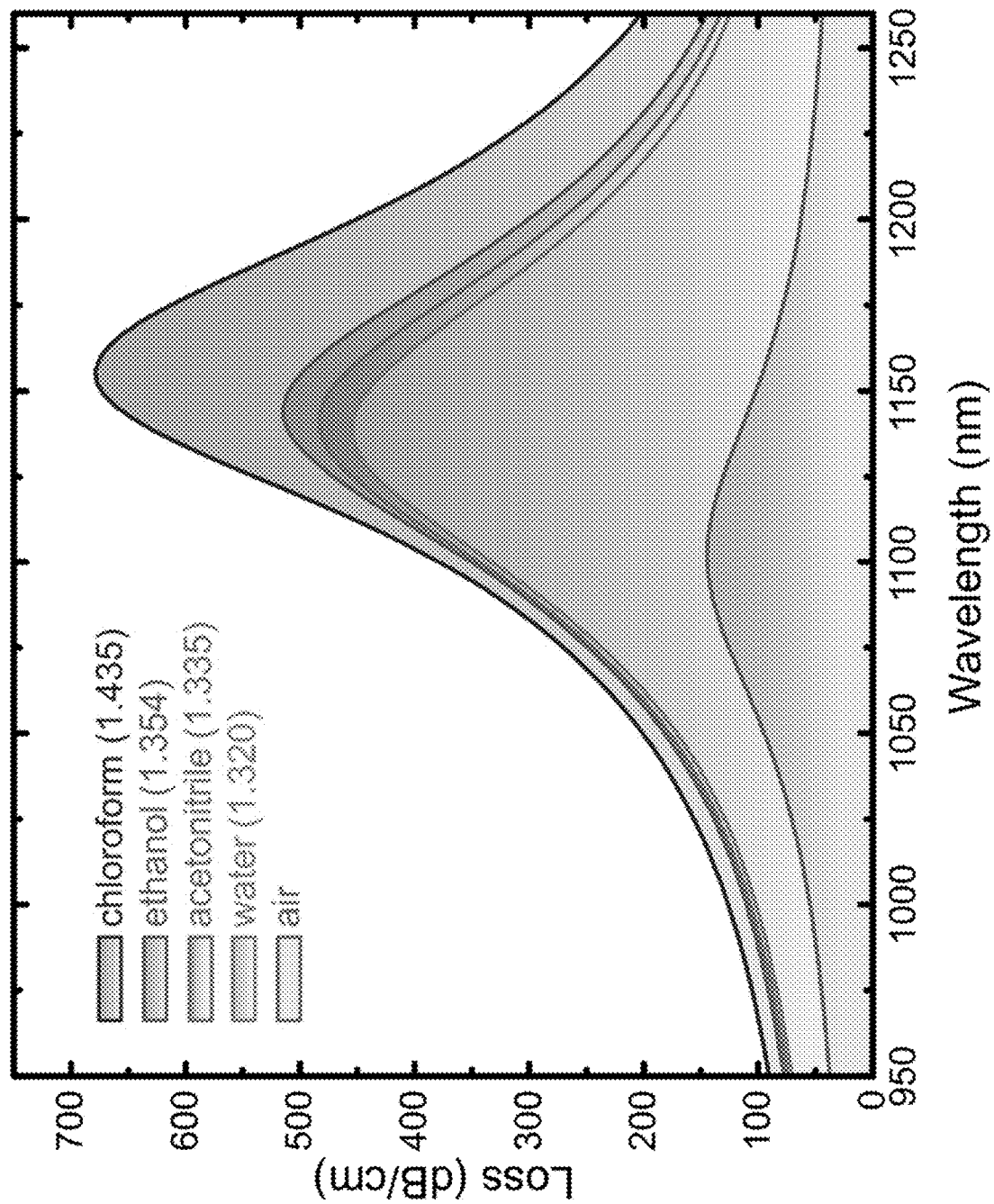
FIG. 7A is a schematic graph of refractive index dependence of the ENZ fiber based on various analytes placed inside the core channel of the fiber.

FIG. 7A is a schematic graph of refractive index dependence of the ENZ fiber based on various analytes placed inside the core channel of the fiber. The graph plots the loss spectra of ENZ mode for five analytes whose refractive indices at the resonant wavelengths are given within the parentheses. FIG. 7B is a schematic graph of a refractive index dependence of ENZ resonance wavelength. FIG. 7C is a schematic graph of a refractive index dependence of loss. The red lines are the linear fits to the data points obtained from the main graph of FIG. 7A and yield a slope of 121 nm/RIU. The field enhancement in the thin ITO layer suggests that the modal properties of the fiber ENZ mode may be sensitive to the perturbations of the surrounding medium's optical properties, in particular, the dielectric permittivity of the constituents in the central hollow channel. Thus, we investigated the dependence of the modal loss spectrum on the refractive index of the central channel. The fiber ENZ modal loss spectra calculated for five different fluids placed in the central channel of the fiber is depicted in FIG. 7A. The refractive index of the fluid at the resonant wavelength was stated inside the parentheses next to the name of the fluid. The permittivity functions of the fluids are obtained from other reports. The thickness of the ITO layer was kept at 20 nm. As seen in the figure, the resonant wavelength shifts from 1102 nm for air to 1156 nm for chloroform. The modal loss for chloroform is found to be 679 dB/cm, which is almost five times greater than with air at the central channel. Increasing the refractive index of the central region in the nanobore fiber effectively shifts the dispersion curve of both the guided fiber fundamental core mode and planar thin film ENZ mode (see FIGS. 2A-2C). This in turn results in the phase matching wavelength getting larger due to the change of the index of the hollow channel.

FIG. 8A is a schematic electric field profile at ENZ resonance for air as an analyte placed inside the core of an ENZ optical fiber with an ITO shell in the core, the profile being across the entire fiber cross section in the top image with an expanded schematic view of the core below the top image. The black circles outline the structure of the fiber. FIG. 8B is a schematic electric field profile at ENZ resonance for chloroform as an analyte placed inside the core of an ENZ optical fiber with an ITO shell in the core, the profile being across the entire fiber cross section in the top image with an expanded schematic view of the core below the top image. FIG. 8C is a schematic graph of the electric field along the diameter of the fiber in FIG. 8A. FIG. 8D is a schematic graph of the electric field along the diameter of the fiber in FIG. 8B.

FIGS. 8A-8D shows the comparison between the ENZ mode profiles for air and chloroform at the center of the ENZ fiber. Similar to the analysis in the planar structures, the field confinement of the ENZ mode is stronger with the external medium of chloroform, and thus the larger absorption of light was observed in the ENZ fiber with higher refractive index in the central nano-channel. A similar trend is observed in the field profiles for the three-layer geometry shown in FIG. 2D.

The strong dependency on the surrounding dielectric can be exploited for novel optical/bio sensing purposes due to the unique feature of the enhanced field confinement of the ENZ mode in the fiber. For wavelength-based sensing, the average refractive index sensitivity of the ENZ fiber, defined as $\Delta\lambda/\Delta N$ where N is the refractive index of the material in the central channel of the fiber is found to be 121 nm/RIU. The observed sensitivity is comparable with other in-fiber sensing device such as Mach-Zehnder interferometer with waist-enlarged fusion bitaper and it has better performance than some grating-based sensors. In addition, this type of ENZ fiber sensor could be used for sensing material with wide range of refractive index, including refractive index between 1.3-1.4 in which most of the biomaterial lie on. The sensitivity of the ENZ fiber could be significantly enhanced by optimizing the materials and geometry, such as ITO thickness, core/hole diameters, choices of ENZ materials, and the fundamental core mode dispersion (e.g. engineered dispersion with additional cladding holes).

Epsilon-Near-Zero and Field-Effect Tunable Properties in TCO/TMN

FIG. 9A is a schematic diagram of an example of a conducting oxide field-effect structure used in light manipulation. FIG. 9B is a schematic graph of a spatial distribution of the carrier concentration N for different applied voltages using the structure of FIG. 9A. FIG. 9C is a schematic graph of a corresponding real part of the dielectric permittivity of ITO at wavelength of 1550 nm. As referenced above, ENZ materials enable unique optical functions such as tunnelling of electromagnetic waves, non-reciprocal magneto-optical effects, and abnormal non-linearity, and include materials with low permittivity. Unique properties observed include enhanced absorption in TCO ENZ layers, advanced resonant coupling properties with antenna, and strongly enhanced nonlinear response and light generation in a TCO slab. A MOS-field effect ENZ structure 20 can be formed to gate the TCO/TMN materials by combining one or more ENZ layers 10, such as TCO or TMN layers, dielectric insulator layer 24, and a metal layer 26 such as shown in FIG. 9A. A bias voltage from a bias voltage source 28 can be applied to the structure. The permittivity of the TCO (such as ITO) would reach to the ENZ region ($-1<\varepsilon r <1$) via gate-biasing at an applied bias of 2-4 V shown in the gray highlighted area of FIG. 9C, thus leading to a large electric field enhancement generated in the accumulation layer of the ITO. The field effect modulated refractive index change ($\Delta n=1.39$ at wavelength of 800 nm) is at least two orders of magnitude higher than is seen for electro-optic modulation using the Kerr effect. Since the drift velocity of electrons to form the accumulation layer is fast (exceeds THz), with the small footprint and low capacitance of nano-devices, the modulation speed could easily exceed tens of GHz to few hundred GHz, which apply to most of the meta-devices discussed in this disclosure. The low power consumption and high-speed operation device performance are significantly important for many critical applications.

Several studies have been done to demonstrate efficient modulators in a TCO plasmonic waveguide or planar structure geometries and TCO metamaterials. Using the field-effect modulation disclosed herein, a plasmonic modulator with record high dynamic range (2.71 dB/μm) and low waveguide loss (~0.45 dB/μm) and a tunable metasurface with π phase shift via the electrically-induced coupling of ENZ resonance can be created. The TCO field-effect dynamic opens up the possibility of ultra-compact amplitude and phase modulation that can apply this effect to develop efficient dynamic ENZ/metasurface in-fiber devices.

Nanobore ENZ Optical Fiber

Figures 10A, 10B, 10C:
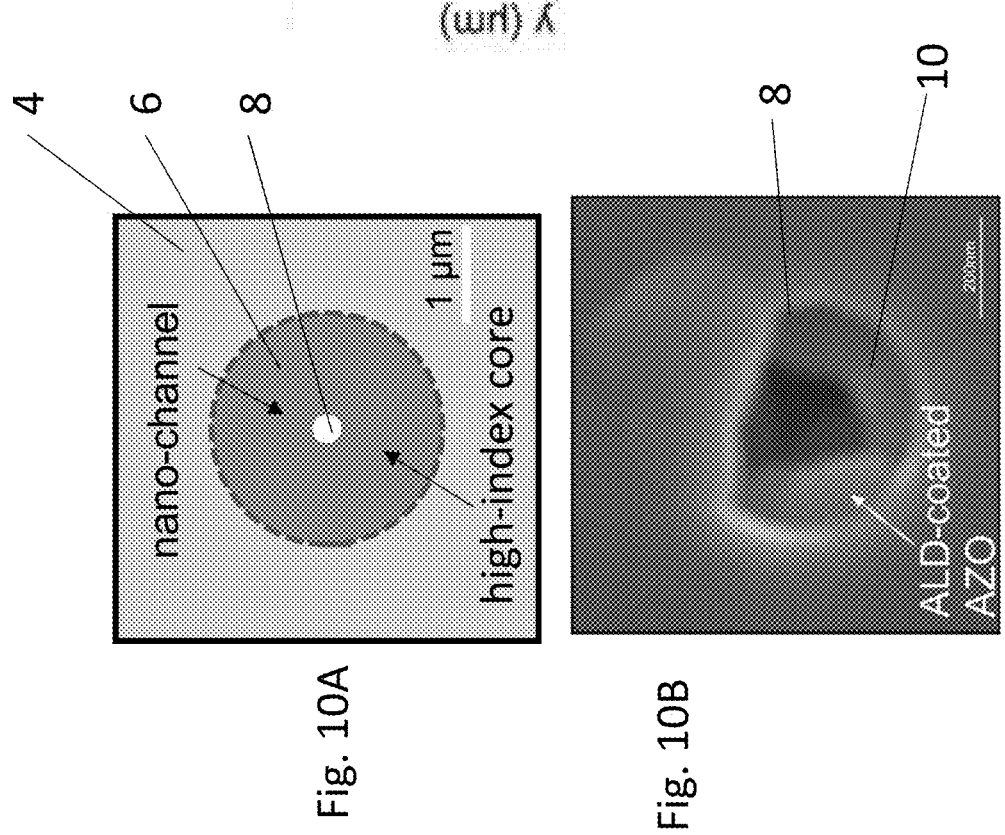
FIG. 10A is a schematic diagram of an example of a nanobore fiber used for excitation of ENZ resonance.
FIG. 10B is a SEM image of a nanobore of the fiber of FIG. 10A showing an AZO coating in the hollow channel of the nanobore as an exemplary ENZ material.
FIG. 10C is a schematic electric field profile of the fundamental mode supported by the ENZ optical fiber of FIG. 10A at a 900 nm outside ENZ wavelength.

FIG. 10A is a schematic diagram of an example of a nanobore fiber used for excitation of ENZ resonance. FIG. 10B is a SEM image of a nanobore of the fiber of FIG. 10A showing an AZO coating in the hollow channel of the nanobore as an exemplary ENZ material. FIG. 10C is a schematic electric field profile of the fundamental mode supported by the ENZ optical fiber of FIG. 10A at a 900 nm outside ENZ wavelength. In at least one embodiment, the disclosed ENZ fiber 2 waveguide design can be a modified version of a nanobore fiber that includes three concentric cylindrical layers as shown in FIG. 1A and with more details on the core and hollow core in FIG. 10A. The two outermost layers act as cladding 4 at least partially around a core 6 (e.g., 4 µm diameter), and a hollow channel 8 of 200-500 nm diameter within the core as shown in FIG. 1A and FIG. 10A. The nanobore optical fiber transmits a large portion of the optical energy confined in the nanoscale central hollow channel in the guided core as shown in FIG. 10C.

Strong light-matter interaction with long interaction length (>10 cm) could be achieved when the hollow channel is filled with the targeted material. For example and without limitation, a 5-20 nm thin layer of TCO (e.g. ITO or AZO) using ALD can be deposited onto the central hollow channel of the fiber. Similar to a planar glass-ITO-air three-layer structure, the TCO material can support the ENZ mode at the wavelength the material's permittivity vanishes and induce strong absorption due to the excitation of ENZ polariton mode. A simulation in FIG. 10C shows that coupling between the fundamental mode of the nanobore fiber and thin film ENZ mode (ENZ wavelength at 1068 nm) (planar ENZ mode dispersion was calculated using transfer matrix method) can occur at the phase matching wavelength (the crossing point between the effective indexes of fundamental core mode and ENZ modes), resulting a loss peak in transmission (FIG. 4). In addition, as the ITO thickness increases, the thin film ENZ dispersion curve shifts toward longer wavelengths and thus the phase matching wavelength (crossing wavelength) with the fiber fundamental core mode.

Furthermore, at the phase matching wavelength, the field confinement inside the ITO layer in the ENZ fiber is the highest and the mode has the highest loss, thus confirming the excitation of the thin film ENZ mode in the fiber structure as described above and shown in FIG. 4B and FIG. 4E. Initial ALD fabrications confirm that AZO thin layer (<100 nm thick) could be fabricated on the hollow channel (500 nm diameter) of the nanobore fiber shown in FIG. 10B with length of ~15 cm.

Anti-Resonance ENZ Hollow Core Fiber

Figures 11A, 11B:
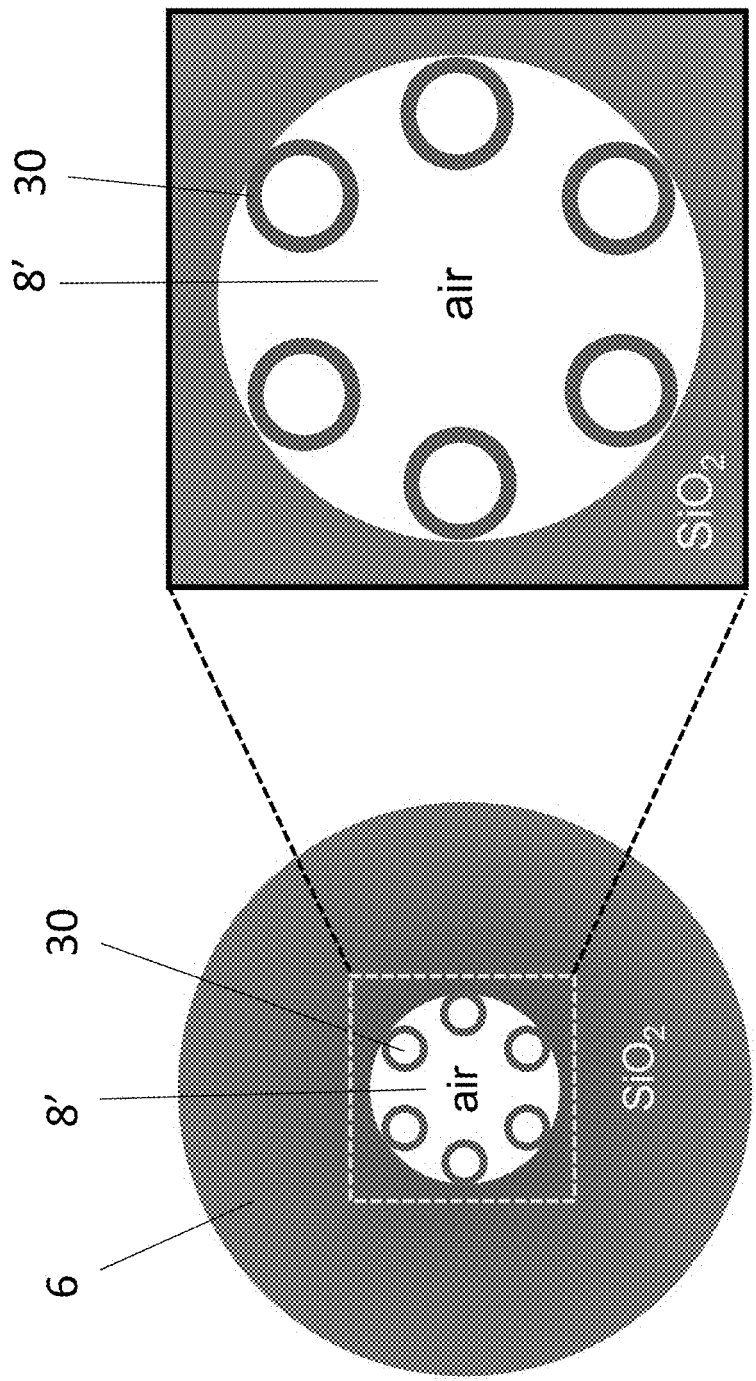
FIG. 11A is a schematic diagram image of an example of another embodiment of an ENZ hollow core fiber with thin tubes around the periphery of a hollow core, the fiber having anti-resonance properties.
FIG. 11B is a schematic enlarged diagram of the hollow core of the anti-resonance ENZ hollow core fiber in FIG. 11A.

FIG. 11A is a schematic diagram image of an example of another embodiment of an ENZ hollow core fiber with thin tubes around the periphery of a hollow core, the fiber having anti-resonance properties. FIG. 11B is a schematic enlarged diagram of the hollow core of the anti-resonance ENZ hollow core fiber in FIG. 11A. The anti-resonance ENZ fiber can include, for example, six uncoated thin tubes 30 with diameter of 12 µm and a hollow-core 8' with a diameter of 26 µm. The anti-resonance hollow core optical fiber can also be used to excite the conducting oxide ENZ resonance.

Figures 11C, 11D:
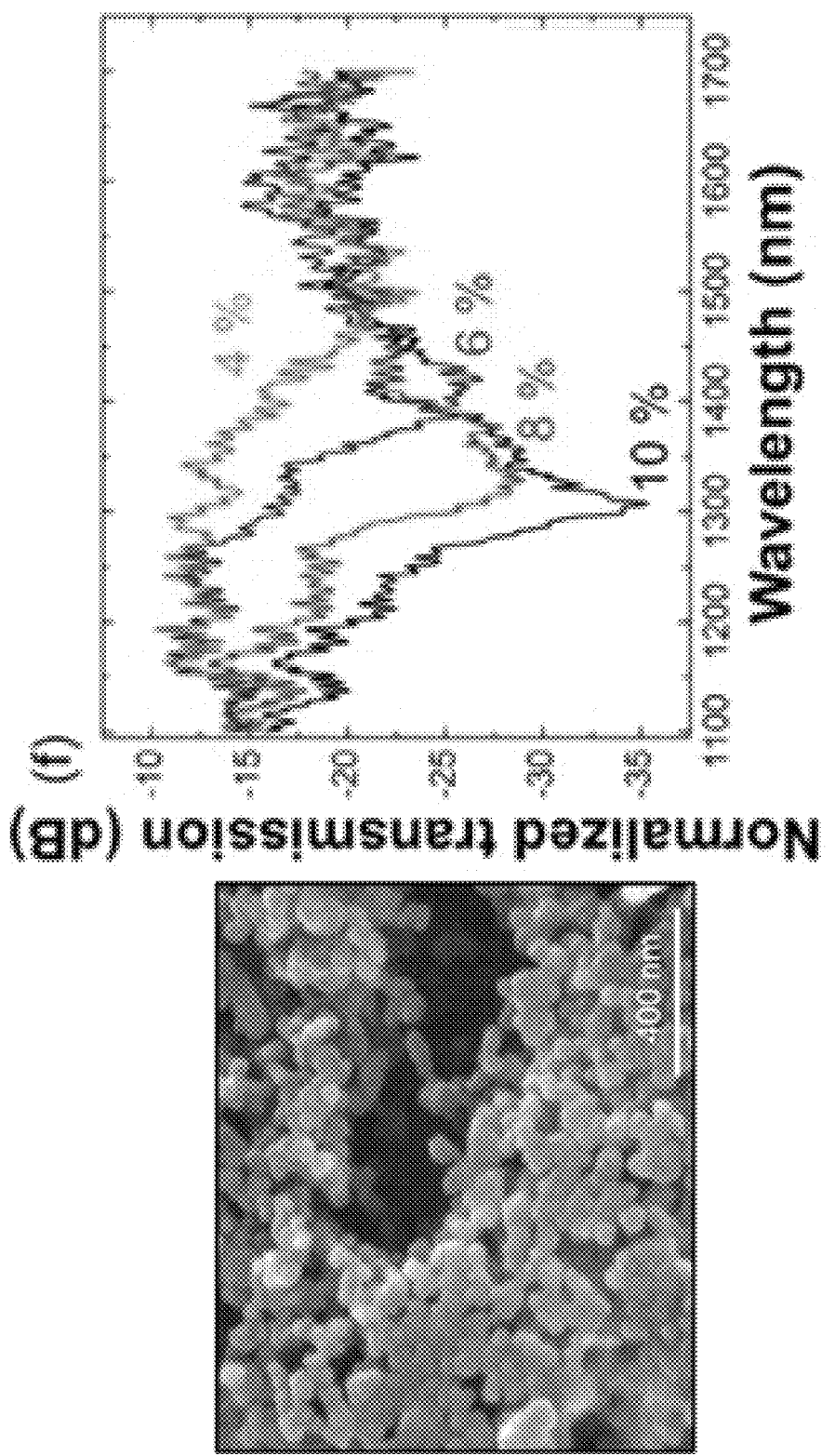
FIG. 11C is a SEM of an example of TCO (AZO) nanoparticles deposited into the hollow core 8'.
FIG. 11D is a schematic graph of measured transmission spectra for the anti-resonance fiber filled with the AZO nanoparticles with different doping concentrations.

FIG. 11C is a SEM of an example of TCO (AZO) nanoparticles deposited into the hollow core 8'. A similar ALD technique can be used to coat a nano-layer of TCO/TMN materials in the sidewall of the hollow core channel to form the ENZ layer. In addition, a wet chemistry technique can be used to synthesize AZO nanoparticles as a layer on the side wall. The AZO nanoparticles provide an extra degree of freedom to control the ENZ layer thickness and ENZ wavelength of the materials. AZO nanoparticles can be prepared with zinc acetate dehydrate $Zn(CH_3COO)_2 \cdot 2H_2O$ as zinc precursor and Al-chloride $AlCl_3$ as aluminum precursors. By changing the weight percentage of aluminum in zinc oxide, the aluminum doping concentration can be modified in ZnO routinely. The AZO nanoparticles are for example a diameter of 50-80 nm.

FIG. 11D is a schematic graph of measured transmission spectra for the anti-resonance fiber filled with the AZO nanoparticles with different doping concentrations. Preliminary results on the transmission measurements of AZO-filled anti-resonance fibers show a transmission dip in the near-IR regime. The transmission dip results from the coupling of the fundamental core mode to the AZO ENZ resonance. It also appears that the resonance dip shifts to a shorter wavelength with a higher doping concentration of the nanoparticles (more metallic). The results indicate the excitation of AZO ENZ resonance and could be useful for novel in-fiber applications to be discussed in the following section.

Figure 11F:
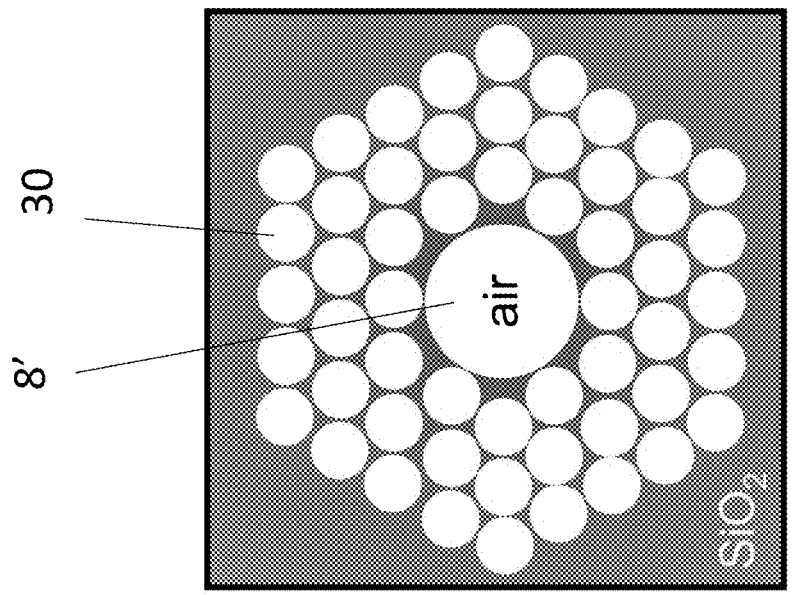
FIG. 11F is a schematic enlarged diagram of the hollow core with the surrounding tubes of the ENZ hollow core photonic crystal fiber in FIG. 11E.
Figure 11E:
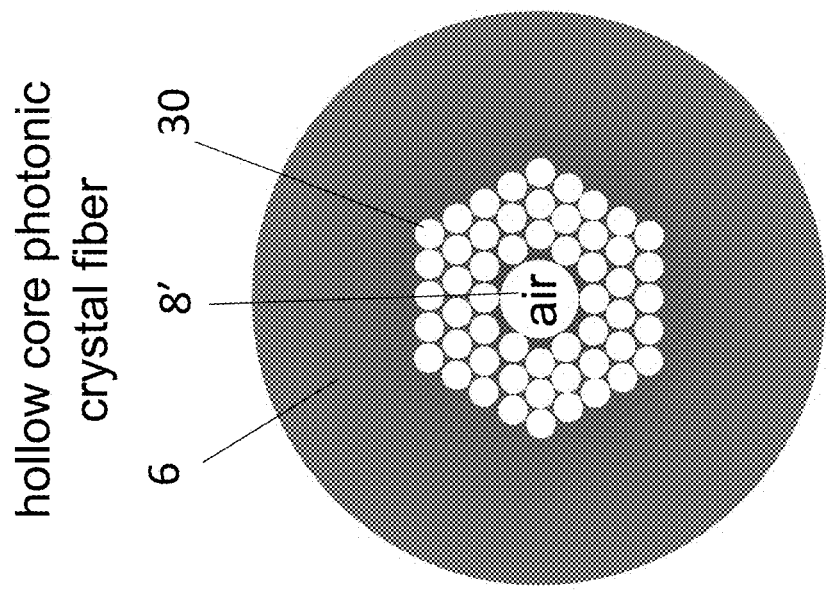
FIG. 11E is a schematic diagram of a hollow core photonic crystal fiber as an example of tubes outside the hollow core that can be used for anti-resonance properties.

FIG. 11E is a schematic diagram of a hollow core photonic crystal fiber as an example of tubes outside the hollow core that can be used for anti-resonance properties. FIG. 11F is a schematic enlarged diagram of the hollow core with the surrounding tubes of the ENZ hollow core photonic crystal fiber in FIG. 11E. In like fashion described for the above embodiment in FIG. 11A, an ENZ layer of nanoparticles can be created in the hollow core 8' to affect the responsive wavelengths of the fiber.

D-shaped ENZ Optical Fiber

Figures 12A, 12B:
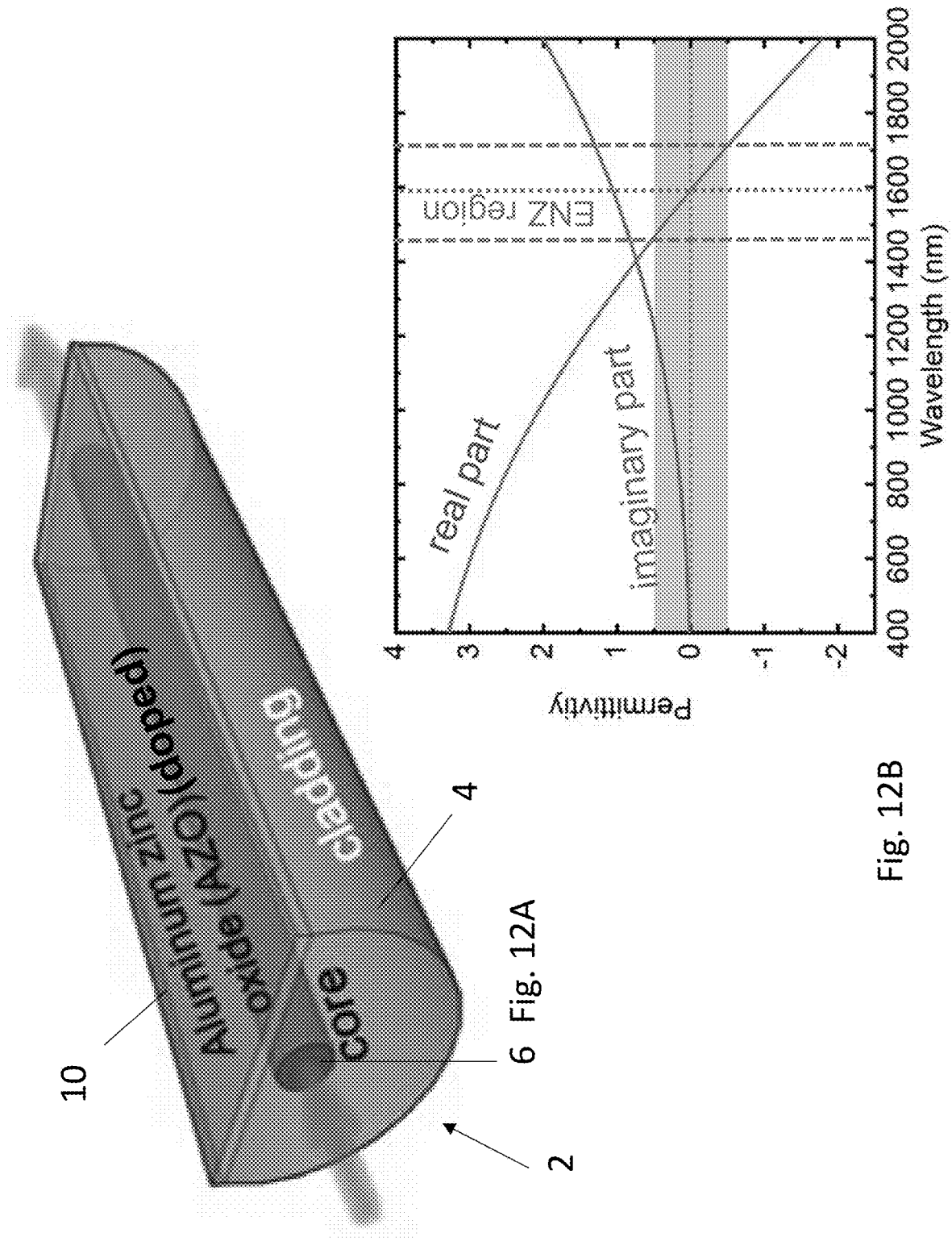
FIG. 12A is a schematic diagram of another embodiment of an ENZ fiber having an ENZ coating external to the core.
FIG. 12B is a schematic graph of a real part of permittivity dispersion of deposited AZO thin film with an ENZ wavelength of about 1580 nm.

FIG. 12A is a schematic diagram of another embodiment of an ENZ fiber 2 having an ENZ layer 10 external to the core 6. The ENZ layer 10 can be, for example, a thin layer of TCO deposited using ALD and sputtering techniques on a surface 34 of the fiber 2. The ENZ layer can be formed in operational proximity to the core (generally external to the core), so that the ENZ layer can affect a light source passing through the core. The ENZ layer can be used for efficient excitation of an ENZ resonance. In at least one embodiment, the surface 34 can be formed as a flat platform to form a D-shaped cross section fiber. The flat platform of the D-shaped fiber can be fabricated by etching/polishing out the cladding, providing a smooth platform for ENZ material deposition. For example, the flat platform can be ~1 µm apart from the doped core, resulting in a large evanescent field from the core to surround to the D-shaped cladding.

Figure 12C:
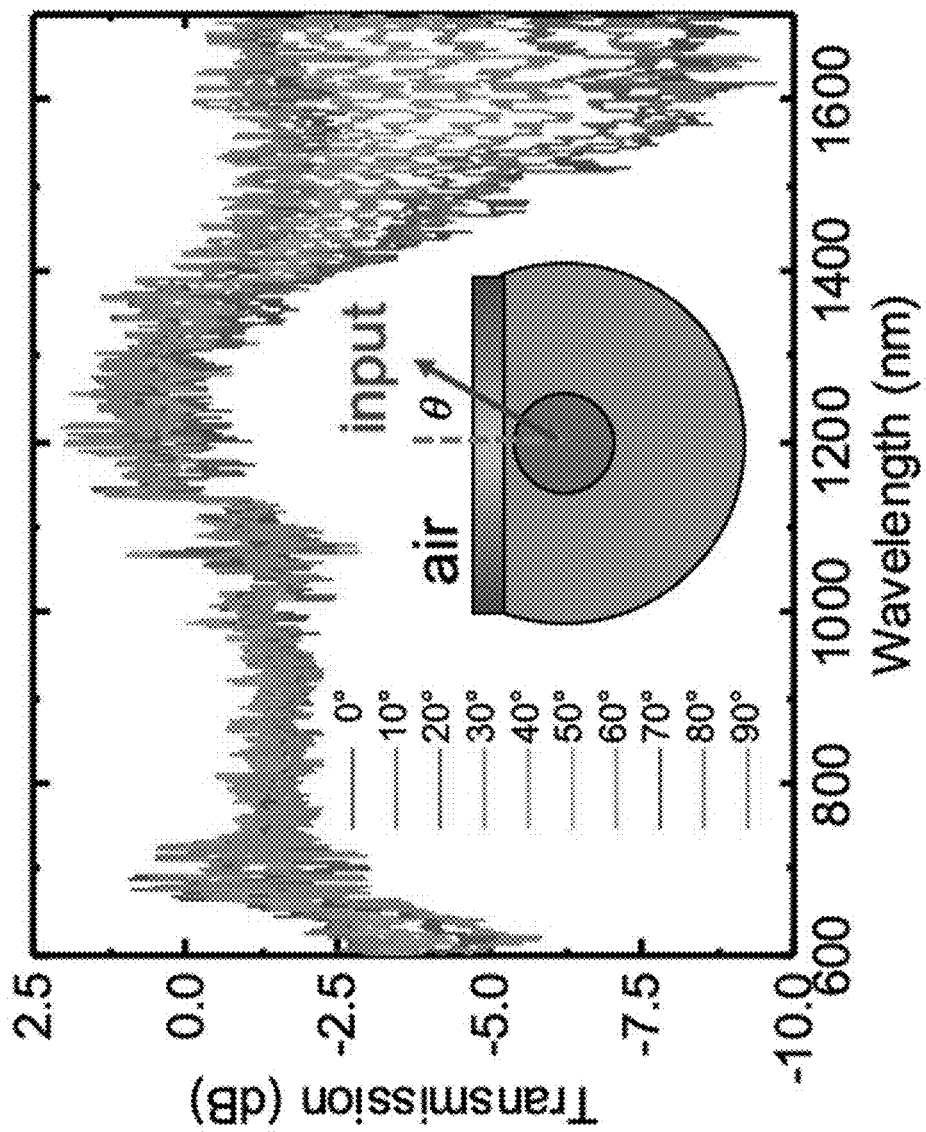
FIG. 12C is a schematic graph of a measured transmission spectrum of AZO ENZ materials on the ENZ fiber of FIG. 12A.

FIG. 12B is a schematic graph of a real part of permittivity dispersion of deposited AZO thin film with an ENZ wavelength of about 1580 nm. FIG. 12C is a schematic graph of a measured transmission spectrum of AZO ENZ materials on the ENZ fiber of FIG. 12A. Similar to the phase-matching coupling mentioned above, at the anti-crossing, the fundamental core mode can strongly couple with the ENZ mode of the nano-layer and cause the modal loss peak in the core. A preliminary experiment by depositing a 20 nm AZO ENZ thin film (ENZ wavelength ~1400 nm) on the D-shape platform shows a strong resonance dip in the transmission in the AZO fiber with 1 cm of the D-shape region, caused by the ENZ mode resonance, shown in FIG. 12C. The resonance dip is strongest with the TM light excitation (vertical electrical field polarization), indicating the ENZ mode properties.

Figures 12D, 12E, 12F:
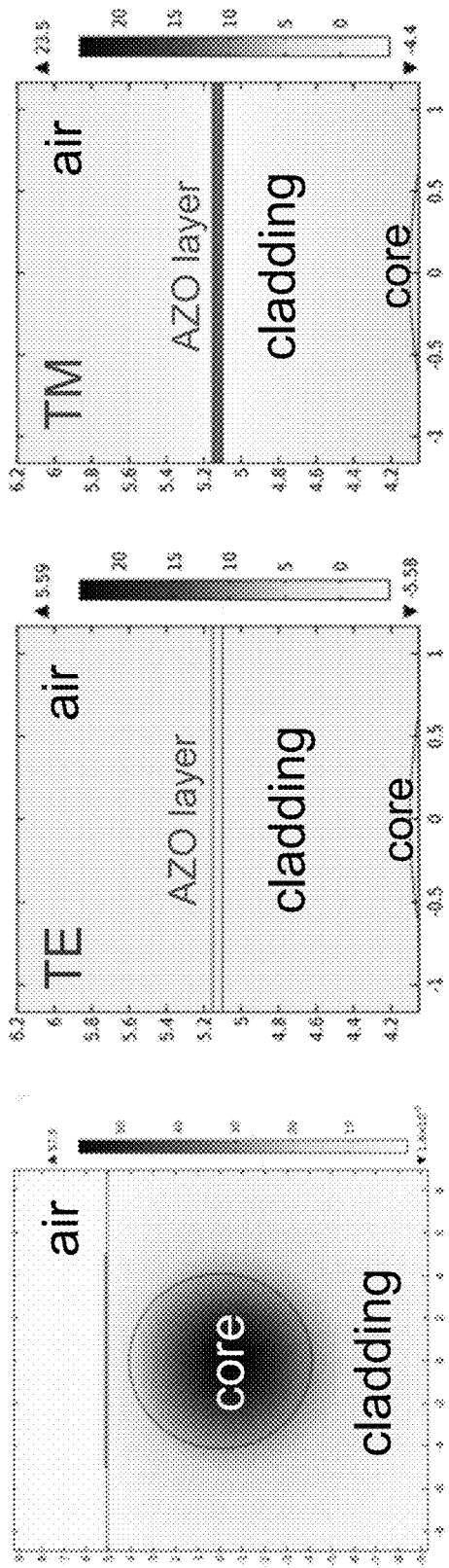
FIG. 12D is a schematic diagram showing a mode profile of the ENZ fiber of FIG. 12A at a resonance wavelength.
FIG. 12E is a schematic diagram showing an enlarged y-component of electrical field distribution for TE incident light for the ENZ fiber of FIG. 12A.
FIG. 12F is a schematic diagram showing an enlarged y-component of electrical field distribution for TM incident light for the ENZ fiber of FIG. 12A.
Figure 12G:
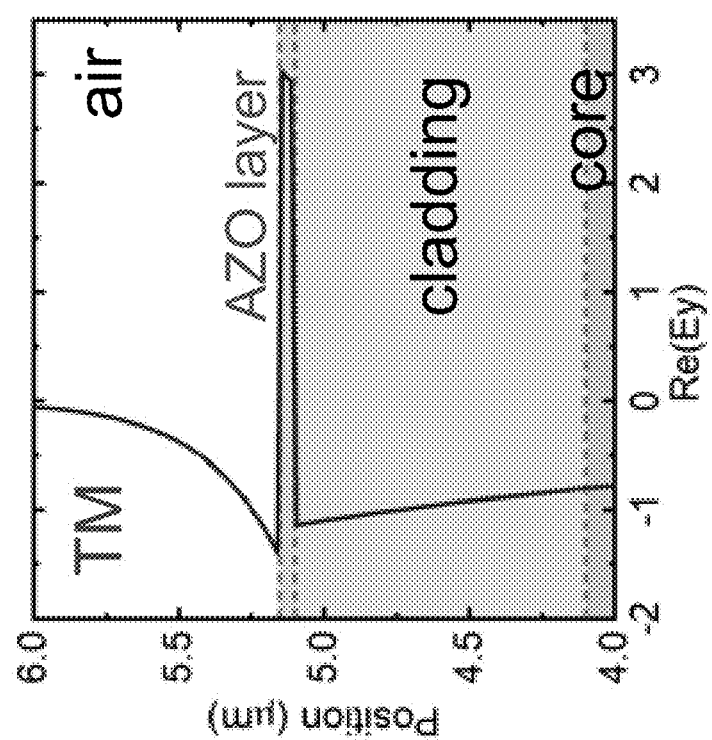
FIG. 12G is a schematic diagram showing a line profile of the y-component electrical field distribution along a diameter of the ENZ fiber of FIG. 12A with TM incident light at a resonance wavelength.

FIG. 12D is a schematic diagram showing a mode profile of the ENZ fiber of FIG. 12A at a resonance wavelength. FIG. 12E is a schematic diagram showing an enlarged y-component of electrical field distribution for TE incident light for the ENZ fiber of FIG. 12A. FIG. 12F is a schematic diagram showing an enlarged y-component of electrical field distribution for TM incident light for the ENZ fiber of FIG. 12A. FIG. 12G is a schematic diagram showing a line profile of the y-component electrical field distribution along a diameter of the ENZ fiber of FIG. 12A with TM incident light at a resonance wavelength. At the resonance wavelength, the electric field is strongly confined in the ENZ layer for the TM polarization state.

The above discussion provides information on the resonant coupling between the propagating fiber fundamental core mode and ENZ mode in an ENZ meta-optical fiber. The results suggest that ENZ optical fiber will find advantages for enhanced light-matter interaction with long interaction length for studying novel ENZ optical properties and in-fiber ENZ device applications. More advanced properties of the ENZ meta-fibers will be discussed in the following section.

Enhanced Magneto-Optical Faraday Rotation in ENZ Fiber for Optical Isolation

Magneto-optical (MO) Faraday rotation has been studied extensively in MO-active materials such as yttrium iron garnet crystals for the application of optical isolation. In such components, optical isolation is achieved by altering the propagation of light by application of an external magnetic field. The magnitude of the Faraday Effect is governed by the Verdet constant, VB, which is a characteristic property of the material. Since the degree of Faraday rotation depends on the product of the Verdet constant and the optical path-length, materials with a smaller Verdet constant require a longer path-length for complete optical isolation. However, typical optical materials (e.g. SiO2 glass) has small Verdet constant. Integration of plasmonic and metamaterial structures with ferromagnetic materials have been proposed to enhance the interaction and the Verdet constant of the nanostructures, including metallic hole-array/slit, nano-plasmonic disk/ring, multilayer structures, and propagating plasmonic structure. However, those magneto-plasmonic structures typically exhibit a high optical losses and Faraday rotation with more than 20 degrees is virtually unachievable.

The zero-index materials and metafilm show promise for non-reciprocal magneto-optical enhancement. Since the Faraday rotation $$\Delta\theta \propto \frac{\varepsilon_{xy}}{n},$$

where the $\varepsilon_{x,y}$ is the off-diagonal component of the permittivity tensor of the materials and n is the linear refractive index of the material, strong MO-enhancement could be observed when the linear refractive index reached close to zero (ENZ regime). However, to date, there is no experimental verification on the enhanced Faraday rotation in ENZ materials due to the weak interaction from the ultra-thin ENZ films or metasurfaces.

It is believed that the non-reciprocal magneto-optical effects of ENZ materials can be demonstrated and verified by integrating the ENZ active layer into the ENZ optical fiber with long interaction length. The result can be a MO-ENZ fiber with large Faraday rotation of >90 degrees. In addition, the result can be a reconfigurable TCO nanostructures that provide field-effect tuning of the magneto-optical response in ENZ fiber for development of novel in-fiber isolator and modulator.

FIG. 13A is a schematic diagram of another embodiment of an ENZ fiber having an ENZ layer with magneto-optical (MO) properties. FIG. 13B is a schematic diagram of polarized input light being reoriented by magnetic field through the ENZ coating in the ENZ fiber of FIG. 13A. The ENZ fiber 2, as described above in FIG. 1A, can have a cladding layer 4 with an internal core 6 having a hollow channel 8. The ENZ layer 10 can be formed in the hollow channel 8. The MO Faraday rotation for nanobore ENZ fiber, anti-resonance hollow core ENZ fiber, and D-shaped ENZ fiber discussed above can be shown by measuring the change of polarization state with the applied magnetic field FIG. 13B.

Figure 13C:
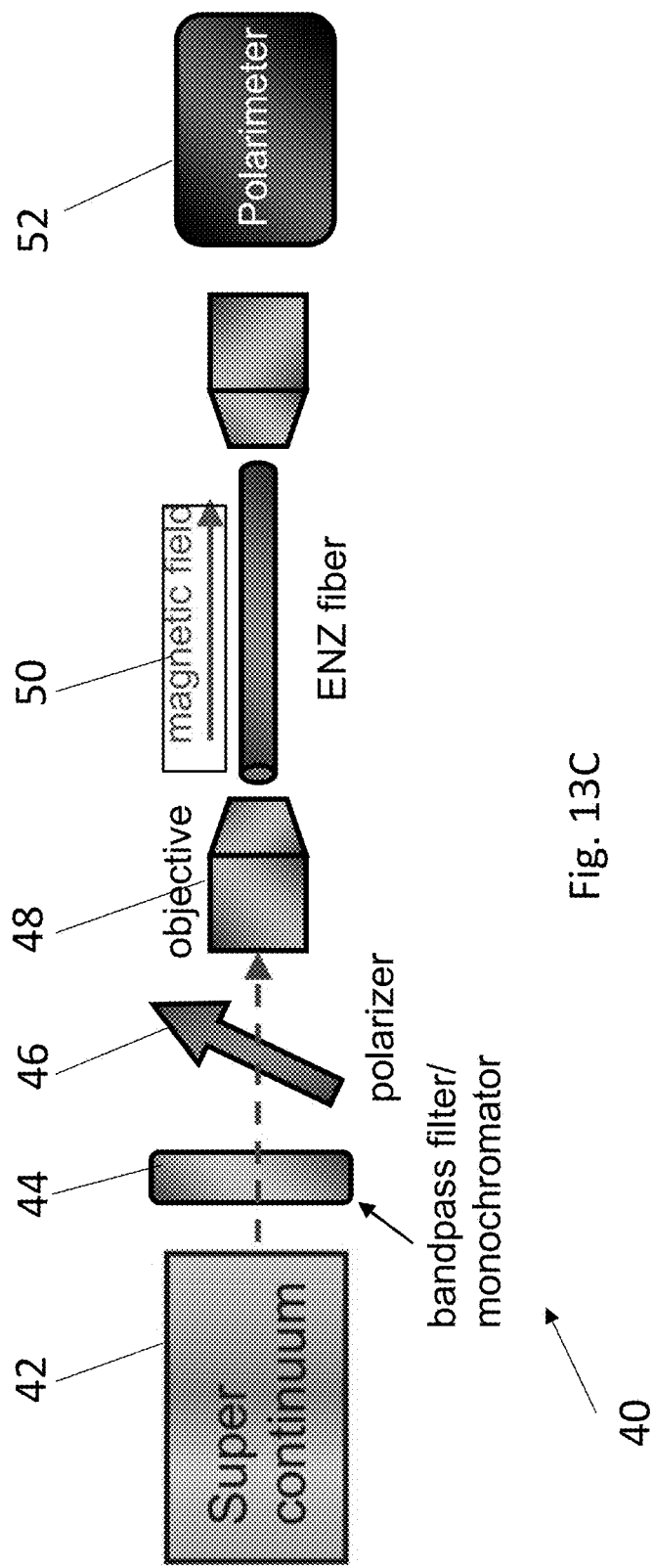
FIG. 13C is an example of a system to reorient and measure a polarized light through the ENZ fiber of FIG. 13A.

FIG. 13C is an example of a system to reorient and measure a polarized light through the ENZ fiber of FIG. 13A. The system 40 can include a light source 42, such as a broadband super continuum (SC) light source, light filter 44, such as a bandpass filter or monochromator, polarizer 46, objective 48, magnetic field source 50, such as a pulsed magnetic coil (up to few hundred mT), and high-sensitivity polarimeter 52 and can be used in the MO measurements. In one example, to minimize the size of the device, the fiber can be coiled multiple turns at several millimeters in diameter. A permanent magnet with magnetic field up to 1-2 T can be used for small polarization rotation. The differences of the polarization angle and the ellipticity between the on- and off-states can be taken to calculate a Faraday rotation angle $\theta_F$. The wavelength dependent Faraday rotation angle can also be measured particularly near the ENZ resonance wavelength for the proposed ENZ fibers described herein.

Results can also account for the effective Verdet constant $$V = \frac{\theta_F}{lB},$$

where the l is the length of the fiber and B is the applied magnetic field. Enhanced Faraday rotation exists in tellurite glass (77TeO2-20ZnO-2.5La2O3) filled optical fiber. Wavelength dependence of effective Verdet constant of the fundamental core mode of the hybrid waveguide with ~2-15 rad/mT can be observed (two order of magnitude higher than silica fiber). The same technique can be used for measuring the Verdet constant of the ENZ fiber. It is believed that a strong enhancement of magneto-optical effects at the ENZ resonance exist for development of efficient a compact in-fiber optical isolator.

Light Modulation in Optical Fiber

Figure 14A:
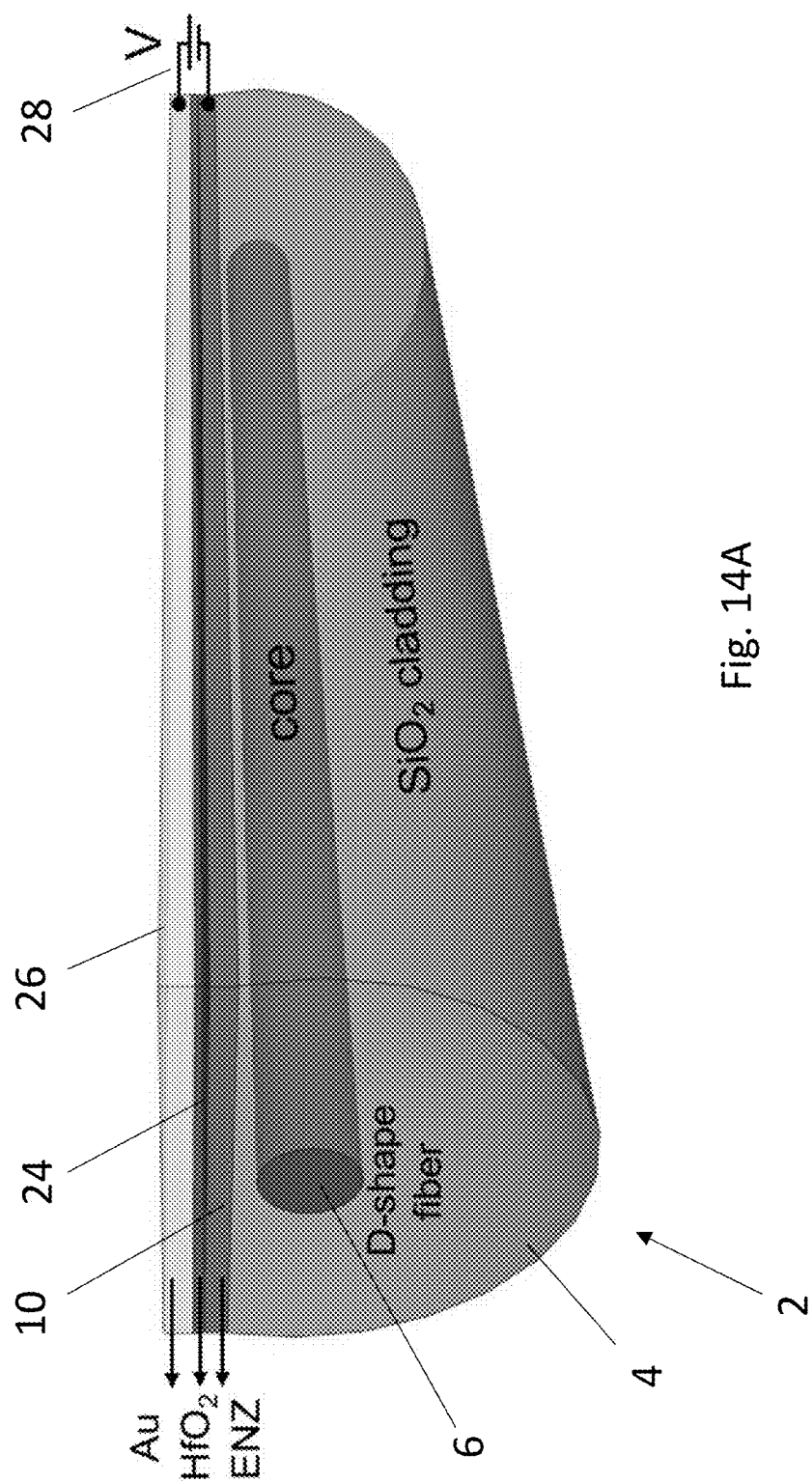
FIG. 14A is a schematic diagram of another embodiment of an ENZ fiber having a tunable ENZ coating external to the core.

FIG. 14A is a schematic diagram of another embodiment of an ENZ fiber having a tunable ENZ coating external to the core. Light modulation in the optical ENZ fiber can be further demonstrated by using an example of a MOS field-effect structure, such as described in FIG. 9A. This structure can include, for example, an ENZ fiber 2, for example a D-shaped fiber, cladding 4, core 6, ENZ layer ITO layer 10, dielectric layer 24, such as a thin HfO2 layer, and metal layer 26, such as a gold layer. By applying bias from a bias voltage source 28 between the gold and thin ITO layer, the carrier concentration and permittivity of active layer of ITO near the HfO2-ITO interface can be tuned, thereby changing the coupling of the ENZ fundamental core mode and allowing modulation of light in the fiber such as shown in FIG. 9B and FIG. 9C. For example, such modulation can provide tunable MO-effects and enhanced light emission of ENZ optical fibers for active magneto-optical responses and amplitude modulation.

Figure 14B:
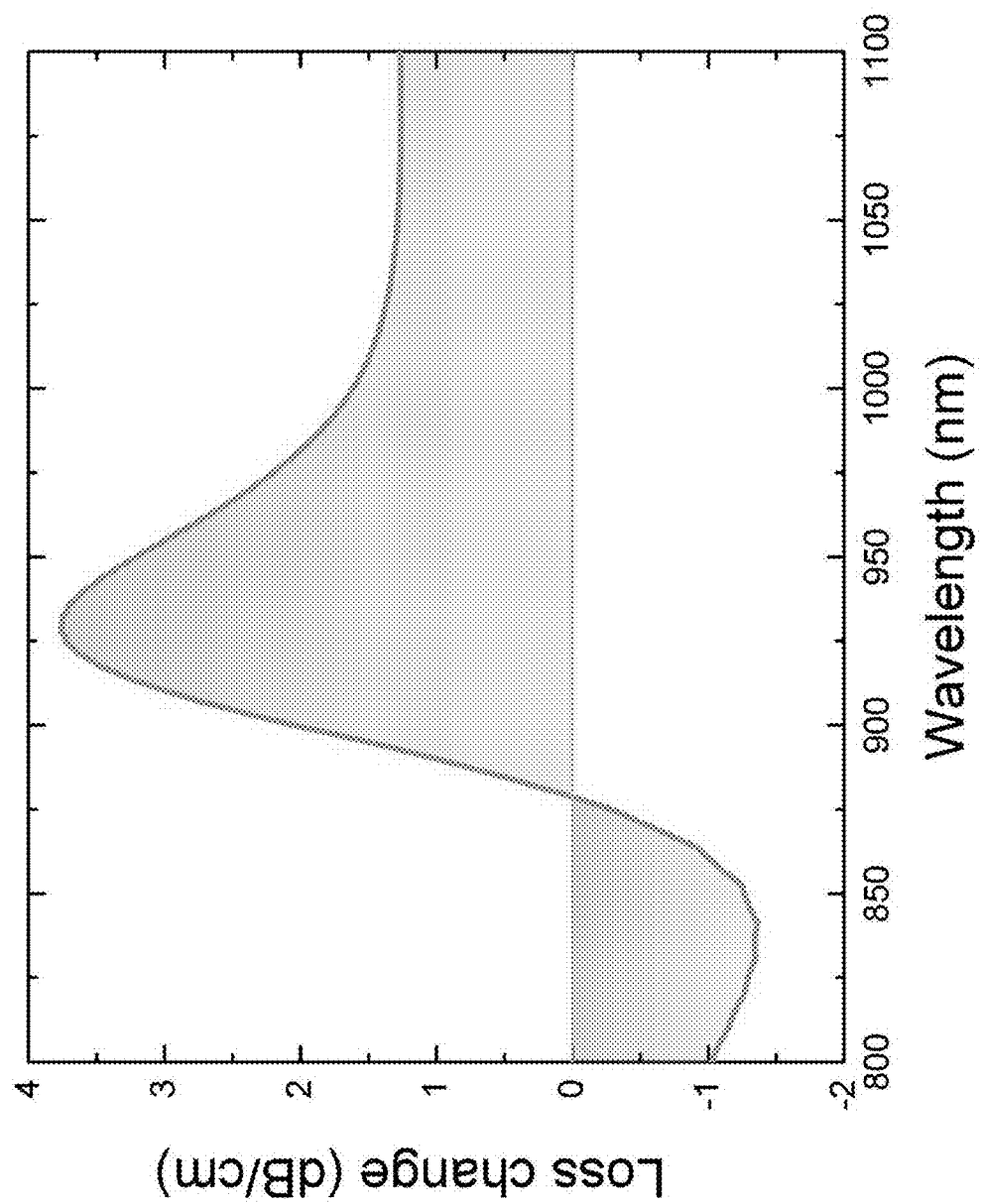
FIG. 14B is a schematic graph of a change of the loss from 0V to 5V for various wavelengths of the ENZ fiber of FIG. 14A.

FIG. 14B is a schematic graph of a change of the loss from 0V to 5V for various wavelengths of the ENZ fiber of FIG. 14A. Our preliminary simulation combined with electrostatic and electromagnetic modelling shows that a change of loss peak for ~3.7 dB/cm could be achieved by applying 5 V.

Figure 14C:
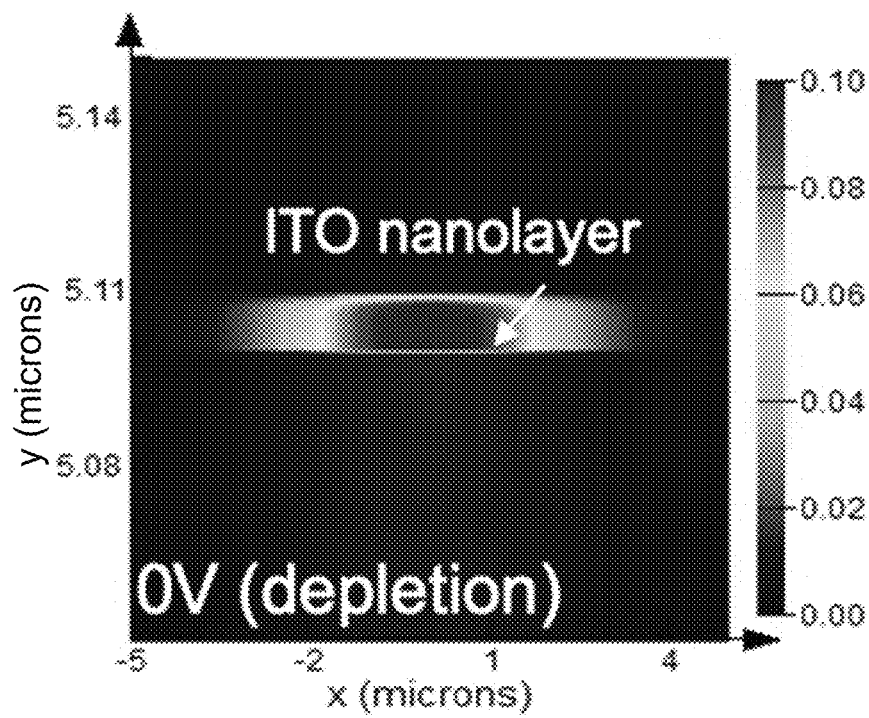
FIG. 14C is a schematic diagram of a carrier concentration profile of the ITO layer for the ENZ fiber of FIG. 14A without an applied voltage.
Figure 14D:
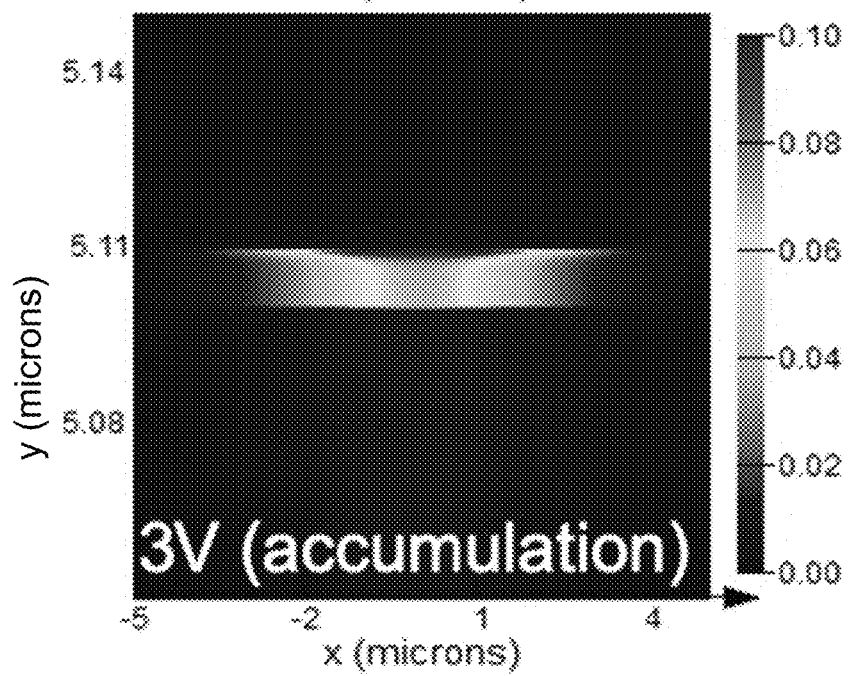
FIG. 14D is a schematic diagram of a carrier concentration profile of the ITO layer for the ENZ fiber of FIG. 14A with an applied voltage of 3 V.

FIG. 14C is a schematic diagram of a carrier concentration profile of the ITO layer for the ENZ fiber of FIG. 14A without an applied voltage. FIG. 14D is a schematic diagram of a carrier concentration profile of the ITO layer for the ENZ fiber of FIG. 14A with an applied voltage of 3 V. The ENZ field profile changes significantly due to the applied bias. The coupling of the ENZ mode and the modulation strength can be further enhanced by reducing the separation between the core of fiber and the ENZ layer, and the thickness of the ENZ layer. The strong change of the ENZ mode coupling can induce a significant change of the quantum emission and MO ENZ effects and provide an active manipulation of light emission, polarization, and amplitude in ENZ optical fiber with ultrafast response and low energy consumption.

A tunable ENZ optical fiber is significant because it can provide with the coupling of the ENZ fiber mode for enhancing and manipulating the magneto-optical effects and light emission. Such enhancements can include, for example, a novel ENZ meta-fiber optical isolator, modulator, and an efficient specialty optical fiber laser.

In summary, the above description shows the ENZ modes supported by a hollow fiber waveguide modified with a thin conducting oxide layer in some embodiments or an ENZ layer external to the core, each that are capable of confining high intensity fields inside a subwavelength cross-sectionally dimensioned nano-channel. At the dielectric to metal crossover point of the conducting oxide, the permittivity approaches zero enabling the excitation of ENZ mode characterized by high field enhancement in the ENZ region. The sensitivity of the waveguide's modal loss to the central channel refractive index can be exploited to sense refractive index of medium and therefore the ENZ fiber has potential applications in many applications including such as optical/bio-sensing. In addition, due to the excitation of the highly confined ENZ mode in the optical fiber waveguide, the ENZ fiber could be potentially useful in studying nonlinear and magneto-optics as well as enhanced quantum emission near ENZ medium, and transmitting optical energy below the diffraction limits in fiber.

Methods

Numerical simulations of the waveguide structure were carried out using the MODE Solutions software from Lumerical Solutions, Inc. The effective index of the ENZ mode supported by three layer structures was calculated using of a MATLAB code developed by G. Figliozzi and F. Michelotti at the University of Rome "La Sapienza" (Italy) based on the transfer matrix method. In the simulations, permittivity function of silica is modelled using the Palik data. Permittivity of GeO2 doped silica (GeO2 wt. 9% doped silica) is obtained from the literature. For ITO, the Drude model is used with the parameters: the electron concentration of $1.0 \times 10^{21}$ cm$^{-3}$, $\varepsilon\infty=3.6$, $\Gamma=2.0263 \times 10^{14}$ s$^{-1}$, $\omega p=3.3722 \times 10^{15}$ s$^{-1}$, In the index sensing analysis, the permittivity functions of the liquids that are placed inside central channel to be analyzed are obtained from literature.

Other and further embodiments utilizing one or more aspects of the inventions described above can be devised without departing from the disclosed invention as defined in the claims. For example, other embodiments can include other shapes and types of optical fibers, other ENZ materials for forming a film on or in an optical fiber, other MOS structures and materials, other thicknesses and frequencies, and other variations than those specifically disclosed above within the scope of the claims.

The invention has been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicant, but rather, in conformity with the patent laws, Applicant intends to protect fully all such modifications and improvements that come within the scope or range of equivalents of the following claims.

What is claimed is:

1. An optical fiber, comprising:
a longitudinal core layer of dielectric material;
a longitudinal cladding layer surrounding at least a portion of the core; and
a longitudinal layer of ENZ material of at least one of a transparent conducting oxide or a transition metal nitride formed on a planar surface of the cladding layer external to the core and parallel to the core,
wherein the optical fiber is configured for a phase matching wavelength between a fundamental waveguide mode of light passing through the longitudinal core layer of dielectric material and an ENZ mode of the longitudinal layer of ENZ material.

2. The optical fiber of claim 1, wherein the ENZ layer is formed of ENZ particles.

3. The optical fiber of claim 1, wherein the ENZ layer is formed in operational proximity to the core and configured to affect a light source passing through the core.

4. The optical fiber of claim 1, wherein the ENZ layer is configured to change a rotational angle of incoming light with an applied magnetic field.

5. The optical fiber of claim 1, further comprising a dielectric layer coupled to the ENZ layer, and a metal layer coupled to the dielectric layer.

6. The optical fiber of claim 5, further comprising a bias voltage source coupled to the metal layer and the ENZ layer.

7. The optical fiber of claim 4, wherein the incoming light comprises polarized light.

8. An optical fiber, comprising:
a longitudinal core layer of dielectric material;
a longitudinal cladding layer surrounding at least a portion of the core; and
a longitudinal layer of ENZ material of at least one of a transparent conducting oxide or a transition metal nitride formed in operational proximity to the core and configured to establish ENZ resonance with light passing through the longitudinal core layer of dielectric material.

* * * * *